(12) United States Patent
MacAfee

(10) Patent No.: US 12,528,594 B2
(45) Date of Patent: Jan. 20, 2026

(54) HYBRID ELECTRICAL ARCHITECTURE

(71) Applicant: Joby Aero, Inc., Santa Cruz, CA (US)

(72) Inventor: Scott MacAfee, Santa Cruz, CA (US)

(73) Assignee: Joby Aero, Inc., Santa Cruz, CA (US)

( * ) Notice: Subject to any disclaimer, the term of this patent is extended or adjusted under 35 U.S.C. 154(b) by 149 days.

(21) Appl. No.: 18/508,619

(22) Filed: Nov. 14, 2023

(65) Prior Publication Data

US 2024/0158093 A1 May 16, 2024

Related U.S. Application Data

(60) Provisional application No. 63/383,659, filed on Nov. 14, 2022.

(51) Int. Cl.
| | |
|---|---|
| *B64D 31/00* | (2024.01) |
| *B60L 53/00* | (2019.01) |
| *B60L 58/40* | (2019.01) |
| *B64D 27/24* | (2024.01) |

(52) U.S. Cl.
CPC .............. *B64D 31/00* (2013.01); *B60L 53/00* (2019.02); *B60L 58/40* (2019.02); *B64D 27/24* (2013.01); *B60L 2200/10* (2013.01); *B64D 2221/00* (2013.01)

(58) Field of Classification Search
CPC ...... B60L 58/40; B60L 2200/10; B60L 53/00; B64D 27/24; B64D 2221/00; B64D 31/00
See application file for complete search history.

(56) References Cited

U.S. PATENT DOCUMENTS

| | | | |
|---|---|---|---|
| 8,469,306 B2 | 6/2013 | Kuhn, Jr. | |
| 9,194,285 B2 | 11/2015 | Botti et al. | |
| 11,323,214 B2 | 5/2022 | Macafee et al. | |
| 11,383,831 B1 * | 7/2022 | Atamanov | B64C 29/0025 |
| 11,565,607 B2 | 1/2023 | Mikic et al. | |
| 11,588,431 B2 | 2/2023 | Bachmann et al. | |
| 11,752,899 B2 | 9/2023 | Mikic et al. | |

(Continued)

FOREIGN PATENT DOCUMENTS

| | | |
|---|---|---|
| WO | 2018058137 | 3/2018 |
| WO | 2024107704 | 5/2024 |

OTHER PUBLICATIONS

Feng, Jianmei, "Designing Hydrogen Recirculation Ejectors for Proton Exchange Membrane Fuel Cell Systems", Energies Journal, (Jan. 21, 2023), 11 pgs.

(Continued)

*Primary Examiner* — Thai T Dinh
(74) *Attorney, Agent, or Firm* — SCHWEGMAN LUNDBERG & WOESSNER, P.A.

(57) ABSTRACT

A hybrid power distribution system for an aircraft includes a first and second set of electrically-powered devices, such as inverters, motors and so forth. A first battery system is coupled to one or more of the first set of electrically-powered devices and a first fuel cell is coupled to one or more of the first set of electrically-powered devices. A second battery system is coupled to one or more of the second set of electrically-powered devices and a second fuel cell coupled to one or more of the second set of electrically-powered devices. The fuel cells and batteries together supply power to the electrically-powered devices as needed, while the fuel cells also keep the batteries charged.

18 Claims, 11 Drawing Sheets

(56) References Cited

U.S. PATENT DOCUMENTS

| | | | |
|---|---|---|---|
| 12,291,188 B2* | 5/2025 | Gesang | B60K 6/28 |
| 2003/0230671 A1 | 12/2003 | Dunn | |
| 2005/0003250 A1* | 1/2005 | Toukura | H01M 8/04156 |
| | | | 429/430 |
| 2014/0106247 A1* | 4/2014 | Higdon | H01M 8/04373 |
| | | | 429/417 |
| 2017/0211474 A1 | 7/2017 | Sennoun | |
| 2019/0241274 A1 | 8/2019 | Hunkel | |
| 2020/0010187 A1 | 1/2020 | Bevirt et al. | |
| 2021/0339881 A1 | 11/2021 | Bevirt et al. | |
| 2022/0009379 A1 | 1/2022 | Mikic et al. | |
| 2022/0320543 A1* | 10/2022 | Nakajima | H01M 10/48 |
| 2022/0380035 A1* | 12/2022 | Atamanov | B64C 29/0025 |

OTHER PUBLICATIONS

Han, Jiquan, "A review of key components of hydrogen recirculation subsystem for fuel cell vehicles", Energy Conversion and Management: X 15, (2022), 16 pgs.

"International Application Serial No. PCT US2023 079607, International Search Report mailed Mar. 13, 2024", 8 pgs.

"International Application Serial No. PCT US2023 079607, Written Opinion mailed Mar. 13, 2024", 8 pgs.

* cited by examiner

HYBRID ELECTRICAL ARCHITECTURE

RELATED APPLICATION DATA

This application claims the benefit of U.S. Provisional Patent Application No. 63/383,659 filed on Nov. 14, 2022, the contents of which are included herein as if explicitly set forth.

FIELD OF THE DISCLOSURE

The present subject matter relates to hybrid electrical architectures. More particularly but not exclusively, the present disclosure relates to hybrid electrical architectures including batteries and fuel cell systems to power aircraft.

BACKGROUND

There is currently a push to transition from internal combustion engines, turbines, and other means of propulsion that utilize fossil fuels. The push to electric and use of batteries may be limited due to current batteries having energy densities that are less than fuel tanks holding fossil fuels of the same volume. Stated another way, a battery having the same size as a gas tank may not have the energy storage capacity to propel a car the same distance.

TECHNICAL FIELD

This invention relates generally to the aviation field, and more specifically to a hybrid architecture for an electrically-powered aircraft.

A fuel cell is an electrochemical cell that converts the chemical energy of a fuel (often hydrogen) and an oxidizing agent (often oxygen) into electricity through a pair of redox reactions. Fuel cells have been used to generate electrical power in many applications, cells are used for primary and backup power for commercial, industrial, and residential buildings and in remote or inaccessible areas. They are also used to power fuel cell vehicles, including forklifts, automobiles, buses, trains, boats, motorcycles, and submarines.

Fuel cell vehicles are powered by hydrogen that is fed into an onboard fuel cell "stack," which transforms the hydrogen's chemical energy into electrical energy. This electricity is then available to power the vehicle and its onboard systems.

Hydrogen supplied to a fuel cell enters the anode, where it comes in contact with a catalyst that promotes the separation of hydrogen atoms into an electron and proton. The electrons are gathered by the conductive current collector, which is connected to the vehicle's high-voltage circuitry, feeding an onboard battery and/or electric motors that propel the vehicle. The byproduct of the reaction occurring in the fuel cell stack is water vapor, which is emitted through an exhaust.

Also included in fuel cell powered vehicles is a "balance-of-plant," which contains all of the other components of a fuel cell system except the stack itself. This includes pumps, sensors, heat exchanger, gaskets, compressors, recirculation blowers or humidifiers, and so forth.

BRIEF DESCRIPTION OF THE FIGURES

In the drawings, which are not necessarily drawn to scale, Like numerals may describe similar components in different views. Like numerals having different letter suffixes may represent different instances of similar components. The drawings illustrate generally, by way of example, but not by way of limitation, various examples discussed in the present document.

DETAILED DESCRIPTION

Aircraft and other vehicles may utilize battery technology for propulsion instead of burning fossil fuels. For example, aircraft and automobiles may use electric motors for propulsion and batteries may be used for energy storage. Electric motors provide a benefit in that they are quiet compared to internal combustion engines or turbines. In addition, batteries can quickly increase or decrease power delivery in response to electrical loads.

Aircraft and other vehicles that utilize battery technology for propulsion instead of burning fossil fuels may have range limitations due to the lower energy density of batteries as compared to fossil fuels. Stated another way, given size and weight limitations placed on batteries, the batteries may only contain enough energy for short trips as compared to a fuel tank of equal volume.

Fuel cell systems, such as hydrogen fuel cell systems, may be used to power electrical components. However, fuel cell systems may have a limitation in that they are not able to quickly increase or decrease power supplied in view of changes in loading on the electrical components. For example, an electric motor commanded to increase power quickly could exceed the power response rate of a fuel cell system.

As disclosed herein, batteries can be used to power electrically-powered devices, such as electric motors, and fuel cell systems can be used to keep the batteries charged during a trip. The batteries may supply constant, or near constant, voltages to electrical components while also being able to adequately supply power due to current spikes that may be caused by increased loading on electrical components.

Consistent with examples disclosed herein, batteries may be used to supply power to electrical components while fuel cell systems may also be used to supply power to the electrical as well as being used to keep the batteries charged. The fuel cell systems may be hydrogen fuel cell systems. The hydrogen may have increased energy density over batteries alone, Thus, the hydrogen stored in tanks may supply more energy than a battery of comparable mass and/or volume. The result may be that vehicles, such as aircraft, may have increased range and usability because smaller batteries can be used to power the electrically-powered devices, while the fuel cell systems recharge the smaller batteries.

The above discussion is intended to provide an overview of subject matter of the present patent application. It is not intended to provide an exclusive or exhaustive explanation of the invention. The description below is included to provide further information about the present patent application.

Figure 1:
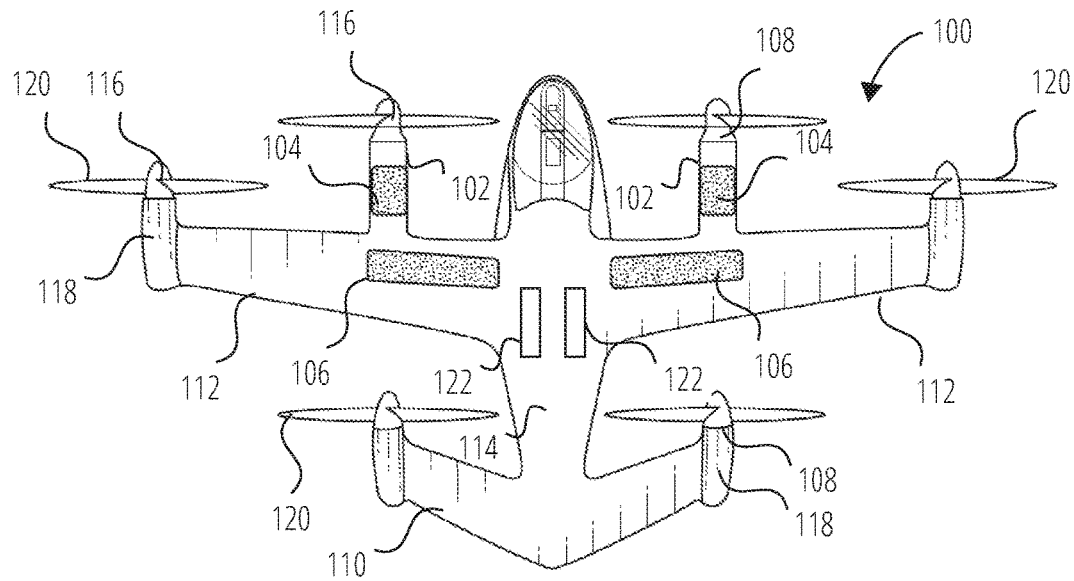
FIG. 1 is a plan view of an aircraft according to some examples.

FIG. 1 is a plan view of an aircraft 100. The aircraft 100 includes a fuselage 114, two wings 112, an empennage 110 and propulsion systems 108 embodied as tiltable rotor assemblies 116 located in nacelles 118. The aircraft 100 includes one or more power sources embodied in FIG. 1 as nacelle battery packs 104, wing battery packs 106 and fuel cells 122. In the illustrated example, the nacelle battery packs 104 are located in inboard nacelles 102, but of course it will be appreciated that the nacelle battery packs 104 could be located in other nacelles 118 forming part of the aircraft 100. The battery packs form part of the battery system 200 described with reference to FIG. 2, and the fuel cells 122 form part of the fuel cell system 300 as described with reference to FIG. 3. The nacelle battery packs 104, the wing battery packs 106, the fuel cells 122 and the propulsion systems 108 are interconnected and function as discussed below with reference to FIG. 5, FIG. 7 and/or FIG. 7. The aircraft 100 will typically include associated equipment such as an electronic infrastructure, control surfaces, a cooling system, landing gear and so forth.

The wings 112 function to generate lift to support the aircraft 100 during forward flight. The wings 112 can additionally or alternately function to structurally support the battery packs 202, battery module 204 and/or propulsion systems 108 under the influence of various structural stresses (e.g., aerodynamic forces, gravitational forces, propulsive forces, external point loads, distributed loads, and/or body forces, etc.), The wings 112 can have any suitable geometry and/or arrangement on the aircraft.

Figure 2:
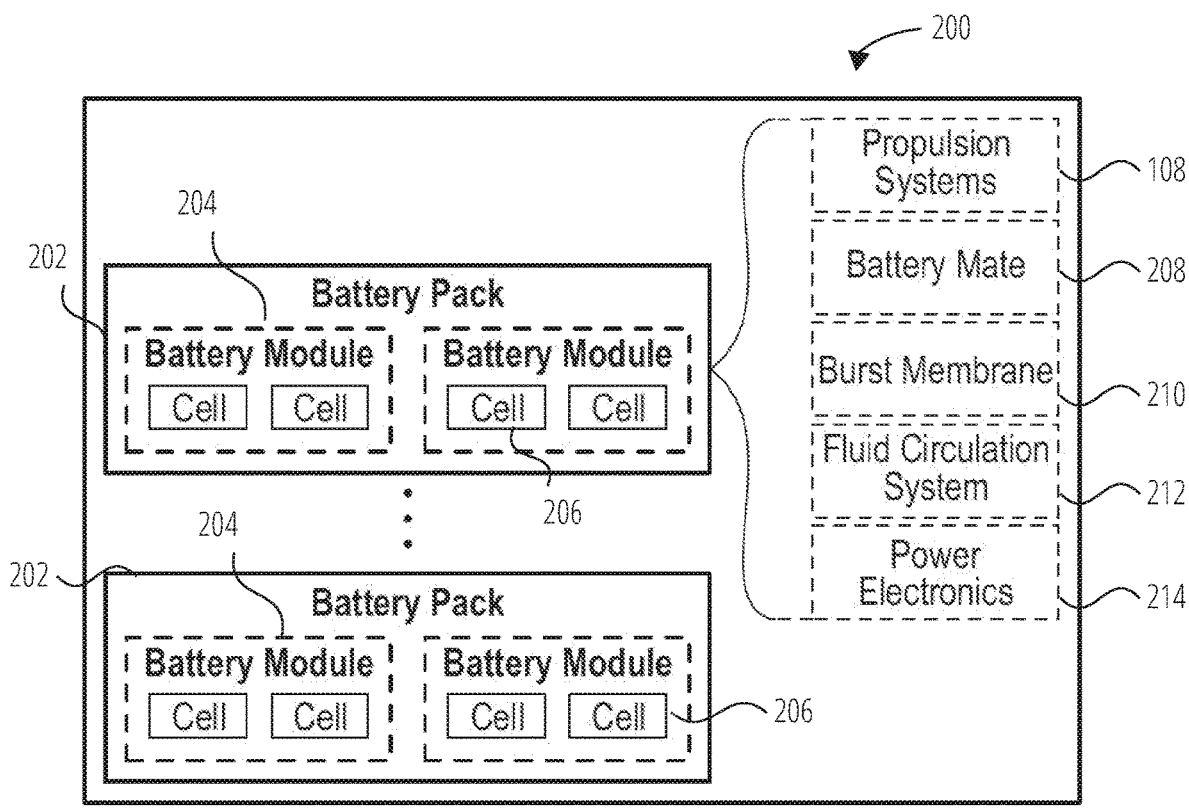
FIG. 2 is a schematic view of an aircraft energy system for use in the aircraft of FIG. 1, according to some examples.

FIG. 2 is a schematic view of an aircraft battery system 200 for use in the aircraft 100 of FIG. 1, according to some examples. As shown, the battery system 200 includes one or more battery packs 202. Each battery pack 202 may include one or more battery modules 204, which in turn may comprise a number of cells 206.

Typically associated with a battery pack 202 are one or more electric propulsion systems 108, a battery mate 208 for connecting it to other components in battery system 200, a burst membrane 210 as part of a venting system, a fluid circulation system 212 for cooling, and power electronics 214 for regulating delivery of electrical power (from the battery during operation and to the battery during charging) and to provide integration of the battery pack 202 with the electronic infrastructure of the battery system 200. As shown in FIG. 1, the propulsion systems 108 may comprise a plurality of rotor assemblies.

The electronic infrastructure and the power electronics 214 can additionally or alternately function to integrate the battery packs 202 into the energy system of the aircraft. The electronic infrastructure can include a Battery Management System (BMS), power electronics (HV architecture, power components, etc.), LV architecture (e.g., vehicle wire harness, data connections, etc.), and/or any other suitable components. The electronic infrastructure can include inter-module electrical connections, which can transmit power and/or data between battery packs and/or modules. Inter-modules can include bulkhead connections, bus bars, wire harnessing, and/or any other suitable components.

The battery packs 202 function to store electrochemical energy in a rechargeable manner for supply to the propulsion systems 108. Battery packs 202 can be arranged and/or distributed about the aircraft in any suitable manner. Battery packs can be arranged within wings (e.g., inside of an airfoil cavity), inside nacelles, and/or in any other suitable location on the aircraft. In a specific example, the system includes a first battery pack within an inboard portion of a left wing and a second battery pack within an inboard portion of a right wing. In a second specific example, the system includes a first battery pack within an inboard nacelle of a left wing and a second battery pack within an inboard nacelle of a right wing. Battery packs 202 may include a plurality of battery modules 204.

The battery system 200 includes a cooling system (e.g., fluid circulation system 212) that functions to circulate a working fluid within the battery pack 202 to remove heat generated by the battery pack 202 during operation or charging. Battery cells 206, battery module 204 and/or battery packs 202 can be fluidly connected by the cooling system in series and/or parallel in any suitable manner.

Figure 3:
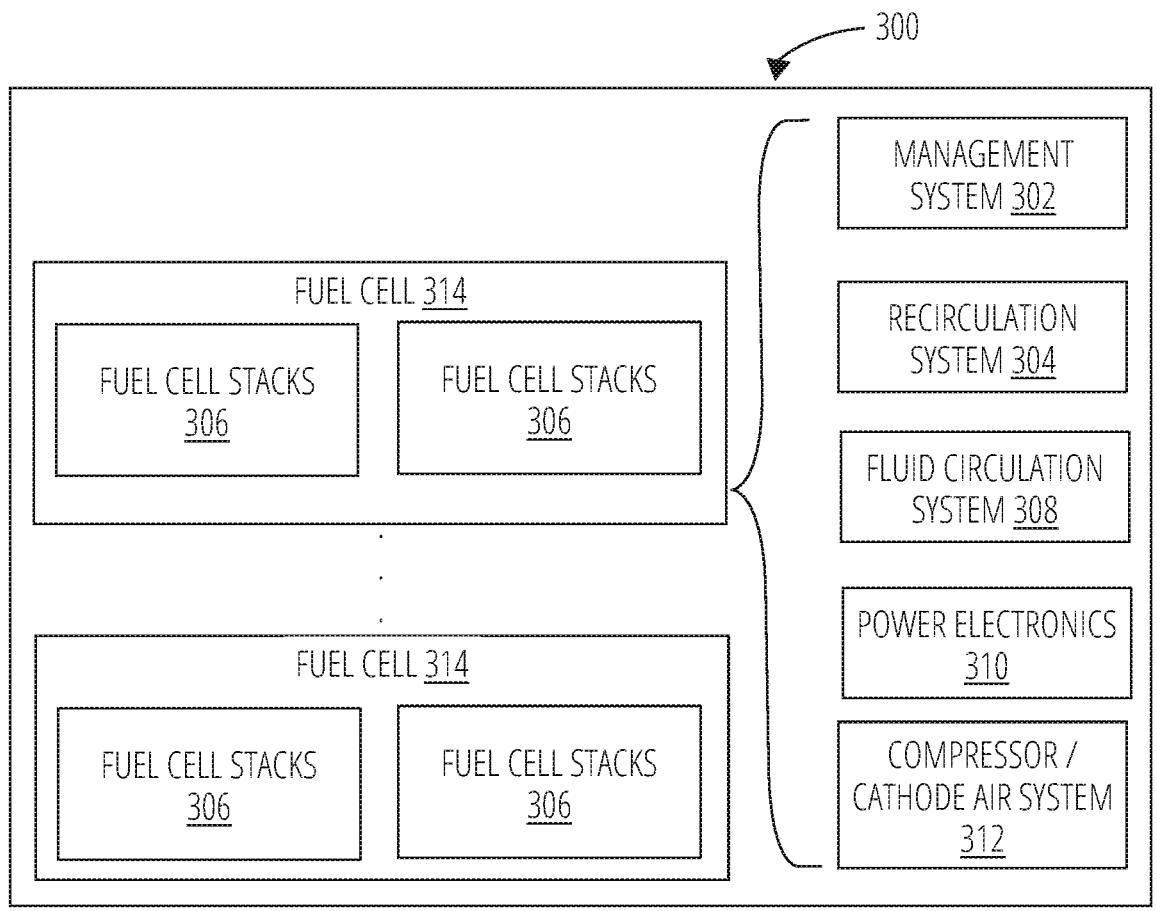
FIG. 3 is a schematic view of an aircraft energy system for use in the aircraft of FIG. 1, according to some examples.

FIG. 3 is a schematic view of an aircraft fuel cell system 300 according to some examples. As shown, the fuel cell system 300 includes one or more fuel cells 314. Each fuel cell 314 may include one or more fuel cell stacks 306.

Typically associated with a fuel cell 314 are a source of hydrogen such as a compressed gaseous or liquid hydrogen tank 402, a recirculation system 304 for supplying and returning hydrogen to the fuel cell 314, a coolant fluid circulation system 308 for transferring heat, power electronics 310 for regulating delivery of electrical power from the fuel cells 314 during operation and to provide integration of the fuel cells 314 with the electronic infrastructure of the aircraft 100, and a compressor/cathode air system 312 for providing compressed air to the fuel cells 314.

The electronic infrastructure can include an energy supply management system 302, for monitoring and controlling operation of the fuel cells 314.

The fuel cells 314 function to convert chemical energy into electrical energy for supply to the propulsion systems 108 and to charge the battery packs 202. Fuel cells 314 can be arranged and/or distributed about the aircraft in any suitable manner, cell stacks can be arranged within wings (e.g., inside of an airfoil cavity), inside nacelles, and/or in any other suitable location on the aircraft.

The fuel cell system 300 can optionally include a heat transfer system (e.g., fluid circulation system 308) and/or that functions to transfer heat from or to various components of the aircraft 100, for example by circulating a working fluid within a fuel cell 314 to remove heat generated during operation, to provide heat for evaporation of liquid hydrogen from the liquid hydrogen tank 402, or to remove heat from other heat-generating components within the aircraft 100.

Figure 4:
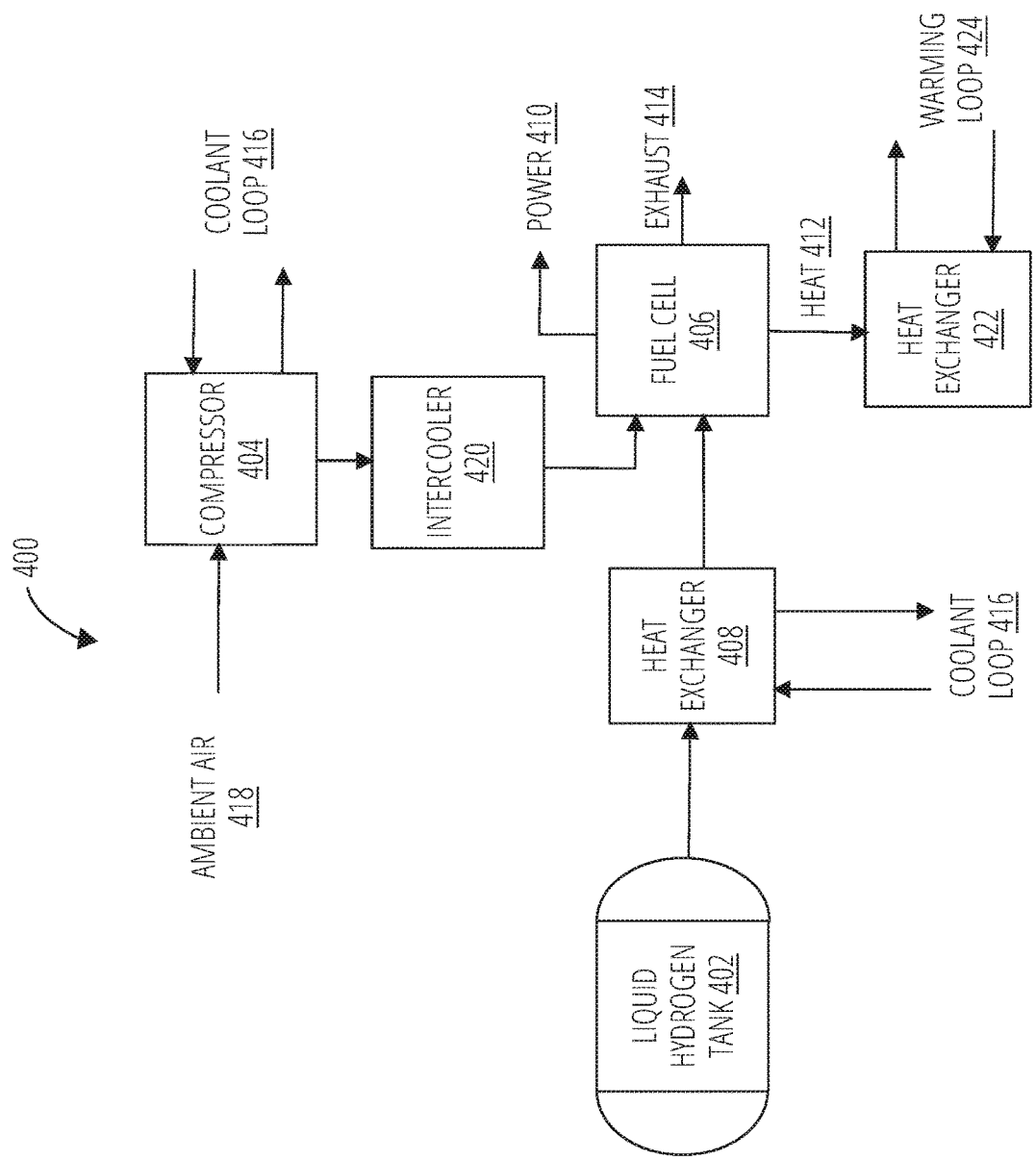
FIG. 4 is a schematic diagram illustrating a hydrogen fuel cell system for use in the aircraft of FIG. 1, according to some examples.

FIG. 4 is a schematic diagram illustrating a hydrogen fuel cell system 400, according to some examples. The fuel cell system 400 comprises a liquid hydrogen tank 402, a heat exchanger 408, a compressor 404 and a fuel cell 406.

The liquid hydrogen tank 402, as its name suggests, stores liquid hydrogen for use in the fuel cell 406. The liquid hydrogen tank 402 is connected to, and supplies liquid hydrogen to the heat exchanger 408, which adds heat to the hydrogen before supplying it to the fuel cell 406.

The heat exchanger 408 provides cooling, via a coolant loop 416, to other heat-generating systems, such as the fuel cell 406 or to the compressor 404, which is used to compress the air containing the oxygen used by the fuel cell 406. The coolant loop 416 includes a coolant liquid that can be circulated to and from a heat source (not shown) to cool the heat source. In some examples, the cold hydrogen gas leaving the liquid hydrogen tank 402 may cool a heat source more directly, for example by having the heat exchanger 408 located at or near the heat source, such as compressor 404.

The compressor 404 compresses ambient air 418 for supply to the fuel cell at the pressure required by the fuel cell 406. Compressing the ambient air 418 increases its temperature. The coolant from the coolant loop 416 may thus be used to precool the ambient air 418 at the inlet of the compressor 404, or to cool the compressor 404 itself. Supplying cooler air to the compressor 404 reduces its power consumption. Air leaving the compressor 404 may be cooled, or cooled further, by an intercooler 420 before being supplied to the fuel cell 406.

Warmer hydrogen gas leaving the heat exchanger 408 is received by the fuel cell, which together with the compressed air received from the compressor 404, generates electrical power 410, heat 412 and a water vapor exhaust 414 as is known in the art. The heat 412 that is generated by the operation of the fuel cell 406 is removed by coolant flowing in a heat exchanger 422, as part of a warming loop 424.

In some examples the coolant loop 416 is also used to cool the fuel cell 406 in addition to or instead of cooling the ambient air 418 or the compressor 404. Other methods for cooling the fuel cell 406 or the air supplied thereto may be used.

Figure 5:
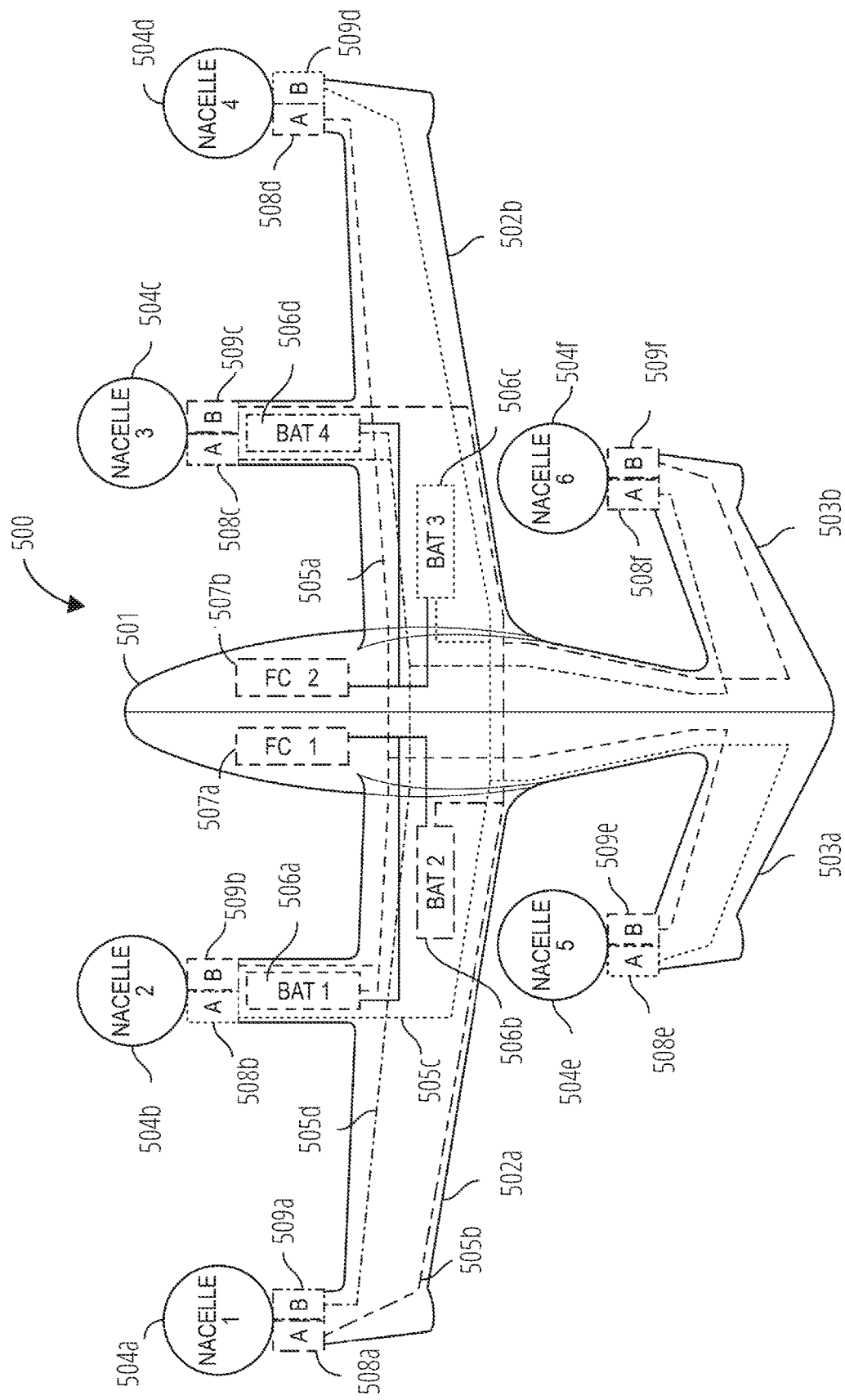
FIG. 5 shows an aircraft having a hybrid electrical architecture system according to some examples.

FIG. 5 shows an aircraft 500 in accordance with at least one example of this disclosure. Aircraft 500 may include a fuselage 501, wings 502a and 502b, horizontal stabilizers 503a and 503b, nacelles 504a, 504b, 504c, 504d, 504e and 504f, and power distribution lines 505a, 505b, 505c, 505d.

As disclosed herein, aircraft 500 may be powered by batteries 506a, 506b, 506c, 506d and fuel cell 507a and fuel cell 507b. Batteries 506a to 506d and fuel cells 507a, 507b may be connected to first electrical devices 508a, 508b, 508c, 508d, 508e and 508f and second electrical devices 509a, 509b, 509c, 509d, 509f and 509e. Non-limiting examples of first electrical devices 508a to 508f and second electrical devices 509a to 509f include inverters, electric motors, set of coils of electric motors, DC/DC converters, DC/AC inverters, and any combination thereof. For example, one or more of first electrical devices 508a to 508f may be inverters that convert direct current (DC) electricity to alternating current (AC) electricity to power one or more electric motors.

One or more of first electrical devices 508a to 508f may also be DC/DC converters that convert a first DC voltage (e.g., a voltage produced by a fuel cell) to a second DC/DC voltage (e.g., a voltage needed to drive an electric motor). The electric motors may in turn cause one or more propellers and/or rotors of the aircraft to rotate thereby generating thrust. Still consistent with examples presented in this disclosure, batteries 506a to 506d and fuel cells 507a and 507b may directly supply electricity to motors and/or other electrical components without the need for use of inverters.

As disclosed herein, the combination of batteries 506a to 506d and fuel cells 507a and 507b provide redundancy. In some examples, first battery 506a, third battery 506c, and first fuel cell 507a may provide electricity to first electrical devices 508a to 508e. Second battery 506b, fourth battery 506d, and second fuel cell 507b may provide electricity to second electrical devices 509a to 509f. In this example, first electrical devices 508a to 508e and second electrical devices 509a to 509f are inverters that deliver electricity to electric motors. Thus, first battery 506a, third battery 506c, and first fuel cell 507a form a first distribution system and second battery 506b, fourth battery 506d, and second fuel cell 507b form a second distribution system. The second distribution system is thus a redundant distribution system, and either the first or the second distribution system can power the aircraft in the event of a failure of the other distribution system.

In some examples, batteries 506a to 506d deliver a battery voltage to both the first electrical devices 508a to 508e and second electrical devices 509a to 509f. The battery voltage from each of batteries 506a to 506d may be the same or may differ. For example, each of batteries 506a to 506d may deliver a constant 48 V. Still consistent with examples disclosed herein, first battery 506a and third battery 506c may deliver 24V while second battery 506b and fourth battery 506d deliver 26V.

In some examples, fuel cells 507a, 507b deliver a charging voltage to batteries 506a to 506d. For example, during operation, batteries 506a to 506d may supply a voltage, such as 48V to first electrical devices 508a to 508e and second electrical devices 509a to 509f, which may be electric motors or inverters for electric motors, depending on the implementation. To keep the batteries 506a to 506d charged, fuel cells 507a, 507b may deliver a charging voltage, which may be 60V or some other voltage, to batteries 506a to 506d.

Electric motors and other electrical devices may require a constant voltage, but have varying current draws. Batteries 506a to 506d may supply the constant voltage, while also being able to adequately increase or decrease current or power output as needed based on loading of the electrical devices. As batteries 506a to 506d are depleted during use, fuel cells 507a, 507b recharge batteries 506a to 506d in some examples.

Each of the motor in the six propulsion systems 108 has two sets of windings, with each motor powered by two inverters, one for each set of windings. In addition to supplying power to propulsion systems 108, the batteries 506a to 506d and the fuel cells 507a, 507b also supply power to rotor deployment mechanisms (nacelle tilt actuators), which are used to position the rotors 120 during various flight modes (vertical take-off and landing configuration, forward flight configuration, and transitions therebetween.

The batteries 506a to 506d and the fuel cells 507a, 507b also supply power to the blade pitch motors and position encoders of the rotors 120 (which have a variable pitch), to control surface actuators used to position various control surfaces on the aircraft 100, and a suite of avionics. The blade pitch motors and the control surface actuators may receive power run through one of the DC/DC converters 606a to 606d, stepping the voltage down or up from a battery or fuel cell voltage as appropriate. A suite of avionics is also be coupled to a flight computer. The batteries battery 506*a* to 506*d* are also rechargeable via an external charger when the aircraft 500 is on the ground.

In the specific example illustrated in FIG. 5, first fuel cell 507*a* supplies power to first battery 506*a* and second battery 506*b*, while second fuel cell 507*b* supplies power to third battery 506*c* and fourth battery 506*d*. First battery 506*a* supplies power to second electrical device 509*b*, first electrical device 508*d*, and second electrical device 509*e* via power distribution line 505*a*. Second battery 506*b* supplies power to first electrical device 508*a*, second electrical device 509*c* and second electrical device 509*f* via power distribution line 505*b*. Third battery 506*c* supplies power to first electrical device 508*b*, second electrical device 509*d* and second electrical device 509*e* via power distribution line 505*c*. Fourth battery 506*d* supplies power to first electrical device 508*c*, second electrical device 509*a*, and first electrical device 508*f* via power distribution line 505*d*.

Figure 6:
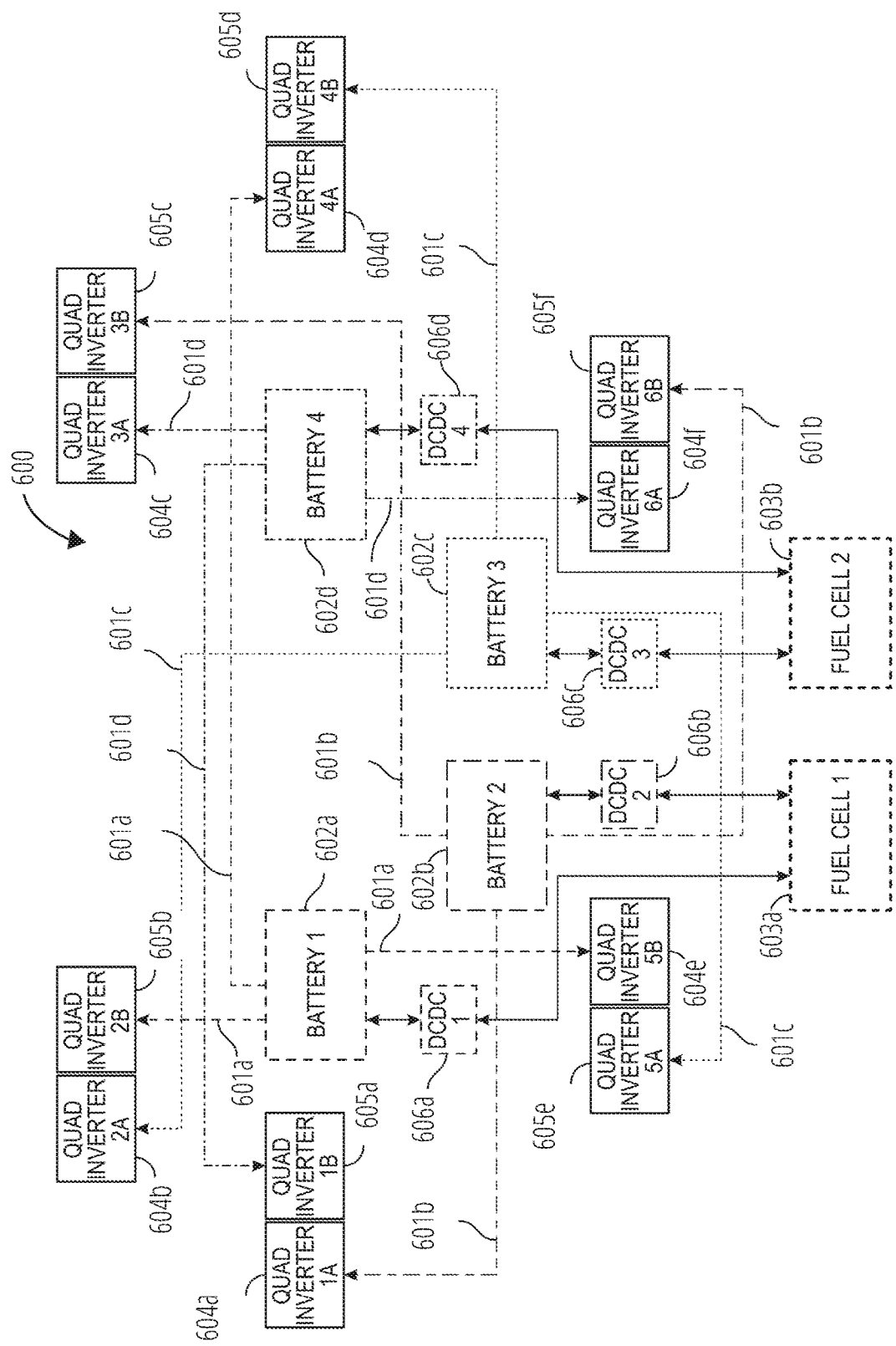
FIG. 6 shows an aircraft having a hybrid electrical architecture system according to some examples.

FIG. 6 shows a system 600 for distributing electrical energy in accordance with at least one example of this disclosure. System 600 may include power distribution lines 601*a*, 601*b*, 601*c*, 601*d*, batteries 602*a*, 602*b*, 602*c* and 602*d*, and fuel cells 603*a* and 603*b*. In some examples, batteries 602*a* to 602*d* and fuel cells 603*a*, 603*b* are connected to first electrical devices 604*a*, 604*b*, 604*c*, 604*d*, 604*e* and 604*f*, and second electrical devices 605*a*, 605*b*, 605*c*, 605*d*, 605*e* and 605*f*.

Non-limiting examples of first electrical devices 604*a* to 604*f*, and second electrical devices 605*a* to 605*f* may include inverters, converters, electric motors, sets of coils of electric motors, and any combination thereof. As disclosed herein electrically-powered devices, such as first electrical devices 604*a* to 604*f* may be inverters that convert direct current (DC) electricity to alternating current (AC) electricity to power one or more electric motors that rotate rotors generating thrust. Still consistent with example presented in this disclosure, batteries 602*a* to 602*d* and fuel cells 603*a*, 603*b* may directly supply electricity to motors and/or other electrical components without the need for use of inverters. In some examples, electrical devices are paired (such as first electrical device 604*a* with second electrical device 605*a*, first electrical device 604*b* with second electrical device 605*b* and so forth) so that each pair provides power to an electric motor in an individual propulsion system propulsion systems 108. In some examples, each electrical device in a pair powers a different set of coils in a motor, to provide further redundancy in the case of failure of a set of coils in the motor.

As disclosed herein, during operation, first electrical devices 604*a* to 604*f*, and second electrical devices 605*a* to 605*f* may operate at a constant, or near constant, power draw. However, during various phases of operation the external load placed on first electrical devices 604*a* to 604*f* and second electrical devices 605*a*, to 605*f* may change. For example, during a forward flight portion or hovering portion of flight, the load on electric motors that drive the rotors may be relatively constant. However, during takeoff or during a transition from a hovering state to forward motion, such as rotation of the rotors from a vertical to a horizontal position, or during maneuvering, the load placed on the electric motors may increase dramatically over a short period of time.

The increase in load over a short time period may cause an increase in current drawn. As disclosed herein, fuel cells 603*a*, 603*b* may not be able to generate the needed power in the short period of time or at the required power level. However, batteries 602*a* to 602*d* are able to provide the needed power. Thus, during high-power operation, batteries 602*a* to 602*d* may power the motors, or inverters that drive the motors (i.e., first electrical devices 604*a* to 604*f* and second electrical devices 605*a*, to 605*f*) to supplement or replace the electrical power provided by the fuel cells 603*a*, 603*b*. To extend the operations past that of an initial charge batteries 602*a* to 602*d* may have, fuel cells 603*a*, 603*b* can continuously, or intermittently, recharge batteries 602*a* to 602*d*, for example during steady-state operations such as in horizontal flight when excess power is available from the fuel cells 603*a*, 603*b*.

System 600 may also have built in redundancy. As shown in FIG. 6, each of batteries 602*a* to 602*d* powers three separate electrical devices of first electrical devices 604*a* to 604*f* and second electrical devices 605*a*, to 605*f*. Stated another way, each of batteries 602*a* to 602*d* powers a subset of first electrical devices 604*a* to 604*f* and second electrical devices 605*a* to 605*f*.

As disclosed herein, during operation, each of batteries 602*a* to 602*d* may supply a first battery voltage to each of a first subset of first electrical devices 604*a* to 604*f* and second electrical device 605*a* to 605*f*. Each of batteries 602*a* to 602*d* may supply a second battery voltage to each of a second subset of first electrical devices 604*a* to 604*f* and/or second electrical devices 605*a* to 605*f*.

As shown in FIG. 6, first electrical devices 604*a* to 604*f* and second electrical devices 605*a* to 605*f* may be inverters used to power electric motors of an electric vertical take-off and landing vehicle (eVTOL) aircraft 100. One of each of first electrical devices 604*a* to 604*f* and second electrical devices 605*a* to 605*f* may be located at a nacelle 118 of the eVTOL aircraft 100 to power a propulsion system 108. Thus, second electrical device 605*a* to 605*f* may be backup devices for first electrical devices 604*a* to 604*f*.

As shown in FIG. 6, each of batteries 602*a* to 602*d* provides power to three electrical devices. The various of first electrical devices 604*a* to 604*f* and second electrical devices 605*a* to 605*f* may be arranged to be located in the various nacelles of an aircraft, such as aircraft 100, 500. Thus, FIG. 6 may represent a six rotor eVTOL aircraft 100 with batteries 602*a* and 602*b* providing power to each of the six motors corresponding to the six rotors 120, and batteries 602*c* and 602*d* also providing power to each of the six motors corresponding to the six rotors 120. Therefore, batteries 602*c* and 602*d* and fuel cell 603*b* may act as a redundant system for batteries 602*a* and 602*b* and fuel cell 603*a* and vice versa.

System 600 may also include DC/DC converters 606*a*, 606*b*, 606*c* and 606*d*. DC/DC converters 606*a* to 606*d* are in electrical communication with batteries 602*a* to 602*d* and fuel cells 603*a*, 603*b* in some examples. During operations, DC/DC converters 606*a* to 606*d* convert a fuel cell output voltage from fuel cells 603*a*, 603*b* to battery charging voltages, in some examples. For example, fuel cells 603*a*, 603*b* may output approximately 60 V, which may be constant or fluctuate. DC/DC converters 606*a* to 606*d* convert or otherwise regulate the output from fuel cells 603*a*, 603*b* to a constant voltage, referred to as a charging voltage, such as for example 48 V, so that fuel cells 603*a*, 603*b* may supply a constant voltage to batteries 602*a* to 602*d* for charging purposes.

The voltages produced by batteries 602*a* to 602*d* may be the same for each battery or different. For example, if each of batteries 602*a* to 602*d* is being used to power an electric motor for a respective rotor, then the output voltages may be the same since each motor may operate at the same voltage. However, if any of the motors operate at a different voltage, or any of batteries 602a to 602d are being used to power other components, such as avionics, lighting, etc. that may operate at a different voltage than the rotors, then the output voltage for a respective battery may differ from that of other batteries. Stated another way, while FIG. 6 shows an example where batteries 602a to 602d are being used to power rotors that may have the same input voltage requirements, any one of or combination of batteries 602a to 602d may be used to power other electric devices with differing input voltage requirements and thus, any one of or combination of batteries 602a to 602d may supply a different input voltage as needed.

Fuel cells 603a, 603b may also supply the same or different voltages to one or more of batteries 602a to 602d, or DC/DC converters 606a to 606d. For example, fuel cell 603a may supply a first voltage to DC/DC converters 606a and 606b, while fuel cell 603b may supply a second voltage to DC/DC converter 606c and 606d. The first voltage and the second voltages, referred to as a charging voltage, may be the same or different.

As disclosed herein, first electrical devices 604a to 604f and second electrical devices 605a to 605f may be divided into subsets of electrical devices. For example, electrical devices 605b, 604d and 605e may constitute a first subset of electrical devices and electrical devices 604b, 605d and 604e may constitute a second subset of electrical device. As such, first electrical devices 604a and 604b are common-function electrical device, (e.g., inverters that drive a common motor for a rotor) in some examples.

In the specific example illustrated in FIG. 6, first fuel cell 603a supplies power to first battery 602a via DC/DC converter 606a and to second battery 602b via DC/DC converter 606b, while second fuel cell 603b supplies power to third battery 602c via DC/DC converter 606c and to fourth battery 602d via DC/DC converter 606d, First battery 602a supplies power to second electrical device 605b, first electrical device 604d, and second first electrical device 604e via power distribution line 601a. Second battery 602b supplies power to first electrical device 604a, second electrical device 605c and second electrical device 605f via power distribution line 601b. Third battery 506c supplies power to first electrical device 604b, second electrical device 605d and second electrical device 605e via power distribution line 601c. Fourth battery 602d supplies power to second electrical device 605a, first electrical device 604c, and first electrical device 604f via power distribution line 601d.

Although not illustrated in FIG. 6 for purposes of clarity, in some examples the fuel cell 603a and fuel cell 603b are also coupled to subsets of the first electrical devices 604a to 604f and second electrical devices 605a to 605f. In such a case, one of each of the two electrical devices for a particular propulsion system 108 is coupled to either the first fuel cell 122 or the second fuel cell 122, so that the aircraft 100 can primarily or completely be powered by the fuel cells 603a, 603b during steady-state operations, such as when in a forward flight mode, Additionally, redundancy is provided by coupling the first fuel cell 603a to the electrical devices to which the third battery 602c and fourth battery 602d are coupled (first electrical device 604b, second electrical device 605d, second electrical device 605e, second electrical device 605a, first electrical device 604c, and first electrical device 604f) and coupling the second fuel cell 603b to the electrical devices to which the first battery 602a and second battery 602b are coupled (second electrical device 605b, first electrical device 604d, first electrical device 604e, first electrical device 604a, second electrical device 605c and second electrical device 605f) such that all of the propulsion systems 108 can be powered by an independent and redundant set of a fuel cell and two batteries.

While FIG. 6 shows batteries 602a and 602c providing power to common devices (i.e., the same rotors), batteries 602a and 602c may supply power to different components. For example, battery 602a may supply power to electrical devices 605b, 604c and 605e, while battery 602b may supply power to electrical devices 604a, 605c and 605f. As such, batteries 602a to 602d, and fuel cells 603a, 603b, may provide cross redundancy to the first electrical devices 604a to 604f and second electrical devices 605a to 605f.

Figure 7:
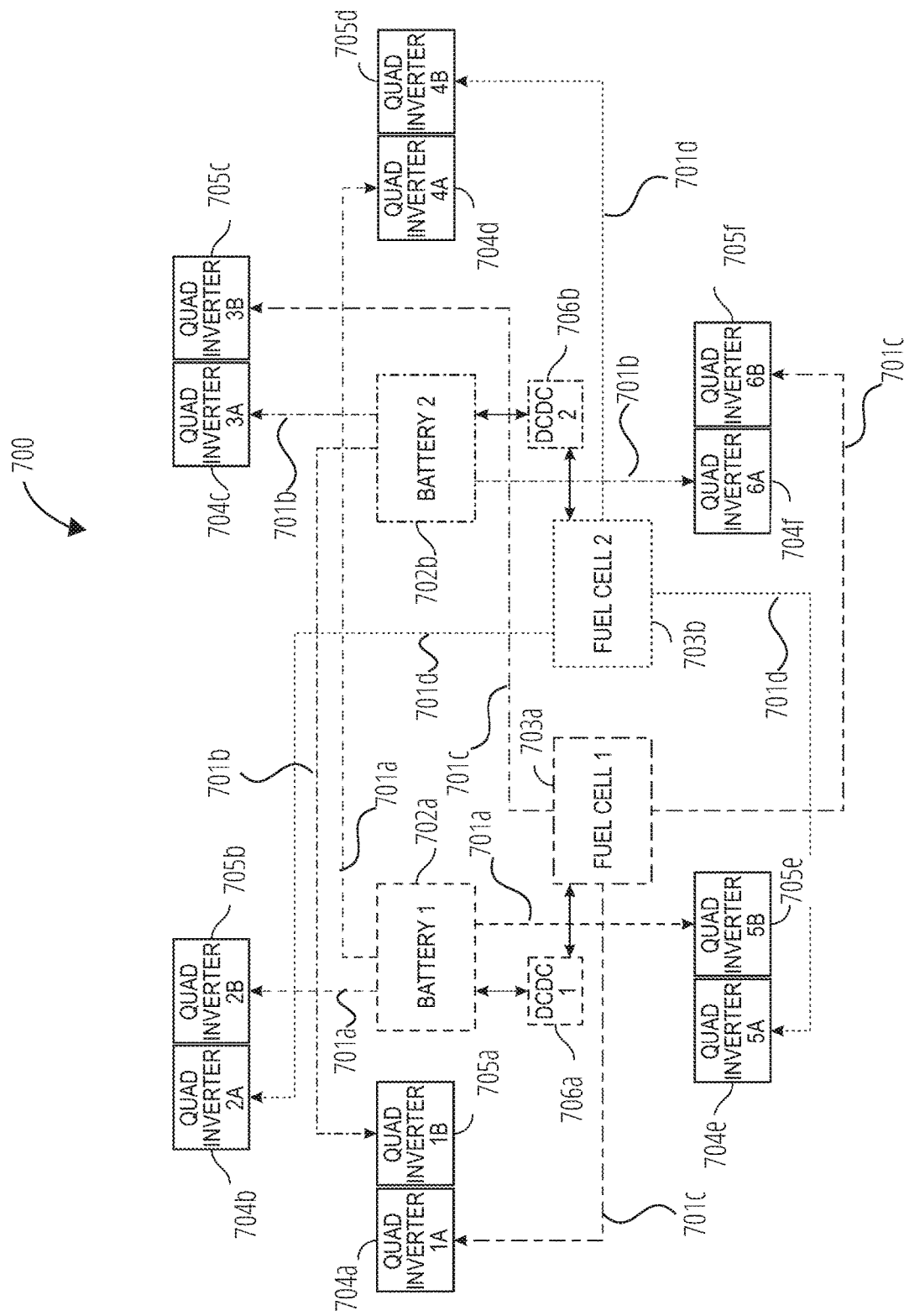
FIG. 7 shows an aircraft having a hybrid electrical architecture system according to some examples.

FIG. 7 shows a system 700 for distributing electrical energy according to some examples. System 700 may include power distribution lines 701a, 701b, 701c and 701d, batteries 702a and 702b and fuel cells 703a and 703b. Batteries 702a, 702b and fuel cells 703a, 703b may be connected to first electrical devices 704a, 704b, 704c, 704d, 704e and 704f) and second electrical devices 705a, 705b, 705c, 705d, 705e and 705f.

Non-limiting examples of first electrical devices 704a to 704e and second electrical devices 705a to 705e include inverters, converters electric motors, and any combination thereof. As disclosed herein electrically-powered devices, such as first electrical devices 704a to 704e may be inverters that convert direct current (DC) electricity to alternating current (AC) electricity to power one or more electric motors that rotates rotors generating thrust. Still consistent with examples presented in this disclosure batteries 702a, 702b and fuel cells 703a, 703b may directly supply electricity to motors and/or other electrical components without the need for use of inverters.

As shown in FIG. 7, fuel cells 703a, 703b supply power directly to first electrical devices 704a to 704e and second electrical devices 705a to 705e. In this example, first electrical devices 704a to 704e and second electrical devices 705a to 705e, or subsets thereof, may operate solely by power supplied by fuel cells 703a, 703b.

Each of first electrical devices 704a to 704e and second electrical devices 705a to 705e are located at respective positions representing a location for a rotor of an eVTOL aircraft 100. As shown in FIG. 7, at each location, each one of first electrical devices 704a to 704e is powered by one of batteries 702a, 702b and each one of the second electrical devices 705a to 705e is powered by fuel cell 703a, fuel cell 703b. During steady-state operations when power draw may be uniform or otherwise constant, fuel cells 703a, 703b may supply power to the rotors while allowing batteries 702a, 702b to remain charged. During transient operations, such as a transition from hovering to cruise flight, when current draws may spike, batteries 702a, 702b may supply the needed power to the various rotors since batteries 702a, 702b may readily supply increased power in a responsive manner that fuel cells may not be able to. Additionally, by using the batteries to supply or supplement power to peak levels, the fuel cell systems can have a lower peak capacity, making them lighter and smaller.

Fuel cells 703a, 703b may also supply power to batteries 702a, 702b via DC/DC converter 706a and 706b. As such, fuel cells 703a, 703b may recharge batteries 702a, 702b during steady-state operations as disclosed herein. Thus, during transient operations when increased power may be needed, batteries 702a, 702b may be discharged to provide additional power.

In the specific example illustrated in FIG. 7, first fuel cell 703a supplies power to first battery 702a via DC/DC converter 706a, and to first electrical device 704a, second electrical device 705c and second electrical device 705f via power distribution line 701c. Second fuel cell 703b supplies power to second battery 702b via DC/DC converter 706b and to first electrical device 704b, second electrical device 705d and first electrical device 704e via power distribution line 701d. First battery 702a supplies power to second electrical device 705b, first electrical device 704d and second electrical device 705e via power distribution line 701a. Second battery 702b supplies power to second electrical device 705a, first electrical device 704c and first electrical device 704f via power distribution line 701b.

As disclosed herein, battery 702a, fuel cell 703a, and subsets of first electrical devices 704a to 704e and second electrical devices 705a to 705e are a first power distribution system and battery 702b, fuel cell 703b, and other subsets of first electrical devices 704a to 704e and second electrical devices 705a to 705e form second, or redundant power distribution system. As disclosed herein, batteries 702a, 702b and fuel cells 703a, 703b may supply the same or different voltages to first electrical devices 704a to 704e and second electrical devices 705a to 705e.

Figure 8A:
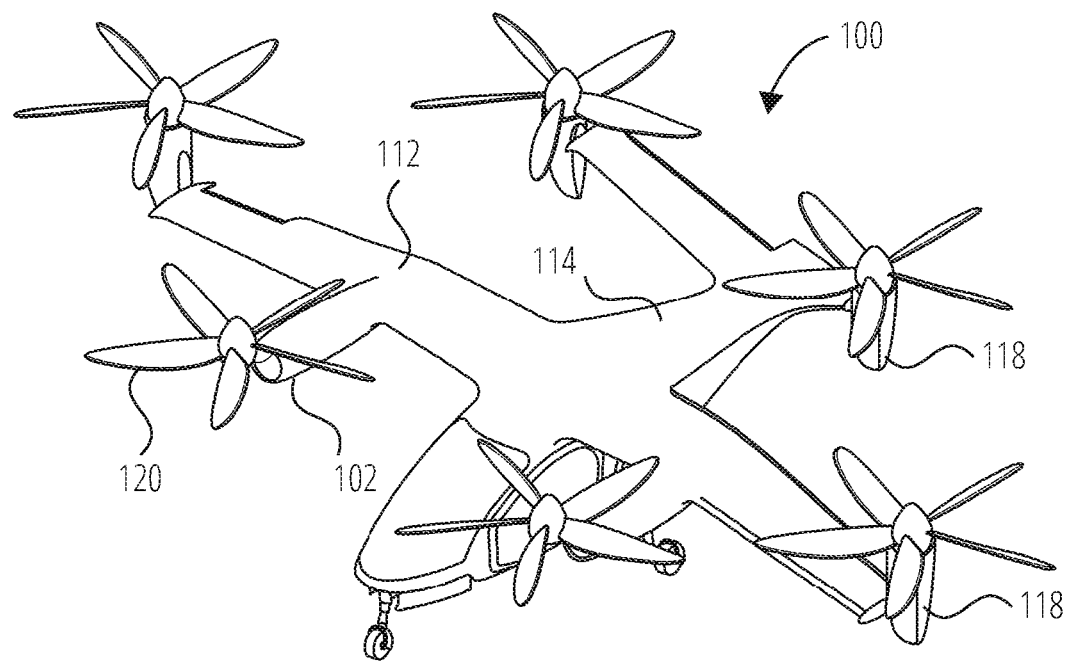
FIG. 8A is a perspective view of the aircraft in a vertical h us configuration, according to some examples.

FIG. 8A is a perspective view of the aircraft 100 in a vertical thrust configuration, according to some examples. The aircraft 100 has fixed wings 112, which may be forward swept wings, with propulsion systems 108 of the same or different types adapted for both vertical take-off and landing and for forward flight. As illustrated in FIG. 8AA, in a vertical take-off configuration the propulsion systems 108 are positioned or configured for vertical thrusting. The propulsion systems 108 along the wings include electric propulsion systems 108 and rotors 120 that are adapted to articulate from a forward flight configuration to a vertical flight configuration using deployment mechanisms that may reside in the nacelle 118, and that deploy the motor and rotor 120 while all or most of the nacelle remains in place attached to the wing. In some aspects, the propeller blades may stow and nest into the nacelle body. The motor driven propulsion systems 108 at the wing tips may deploy from a forward flight configuration to a vertical take-off and landing configuration along a pivot axis wherein the nacelle 118 the electric motor and rotor 120 deploy in unison. Although illustrated with one mid-span propulsion system and one wingtip propulsion system, in some aspects more mid-span propulsion assemblies may be present.

The aircraft fuselage 114 extends rearward and is attached to empennage 110. The empennage 110 has rear propulsion systems 108 attached thereto. The motor driven propulsion systems 108 at the tips of the empennage 110 also deploy from a forward flight configuration to a vertical take-off and landing configuration along a pivot axis, wherein the nacelle and the electric motor and propeller deploy in unison.

Figure 8B:
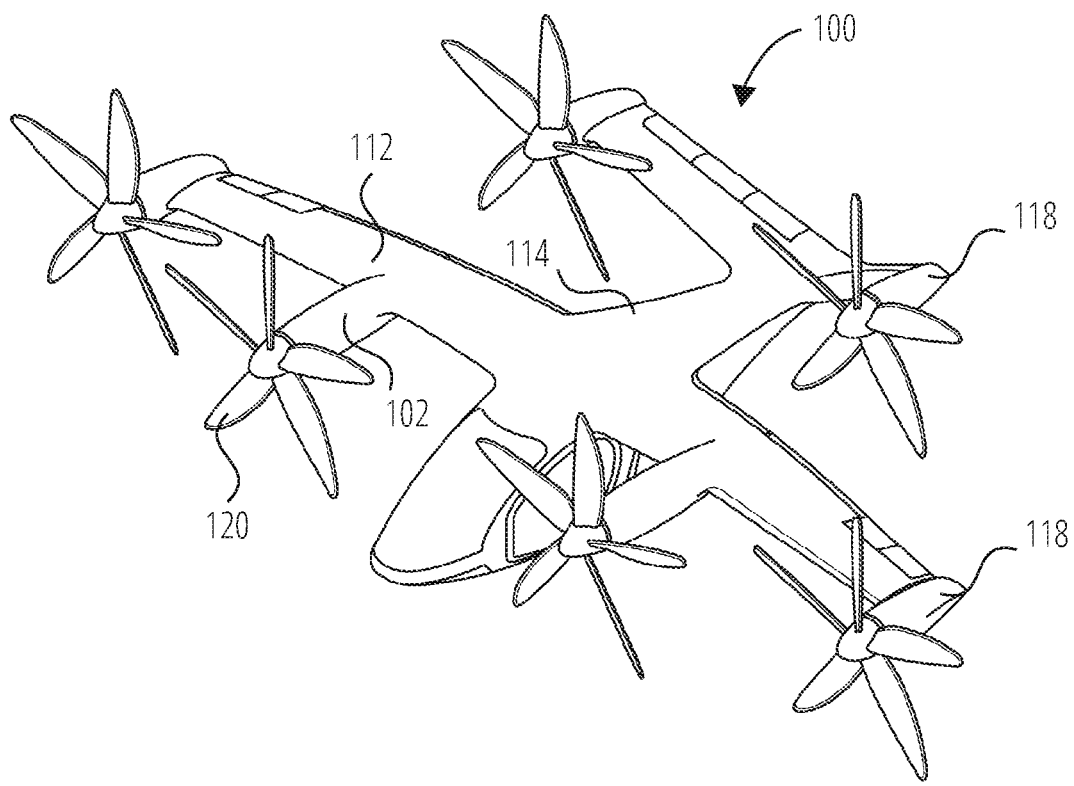
FIG. 8B is a perspective view of the aircraft in a horizontal ust configuration, according to some examples.

FIG. 8B is a perspective view of the aircraft 100 in a horizontal thrust configuration, according to some examples. In this forward flight configuration, the propulsion systems 108 are positioned or configured to provide forward thrust during horizontal flight.

Figure 9A:
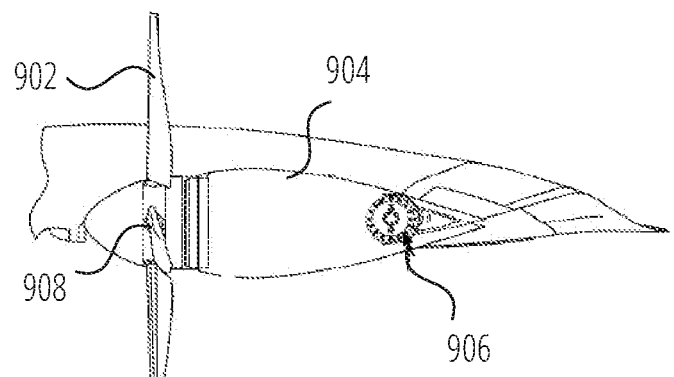
FIG. 9A, FIG. 9B and FIG. 9C illustrate the tilting of an aircraft propulsion system and related components such as a propeller and nacelle according to some examples.
Figure 9B:
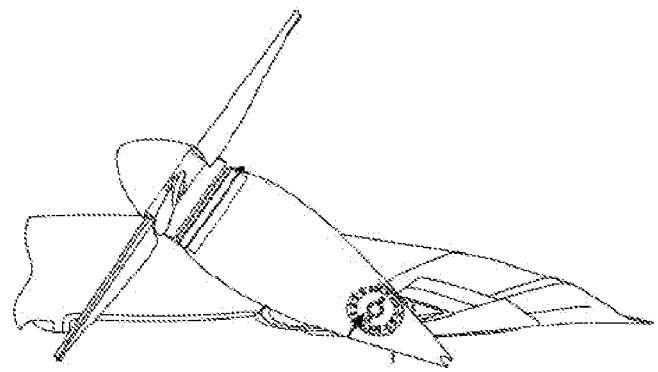
Figure 9C:
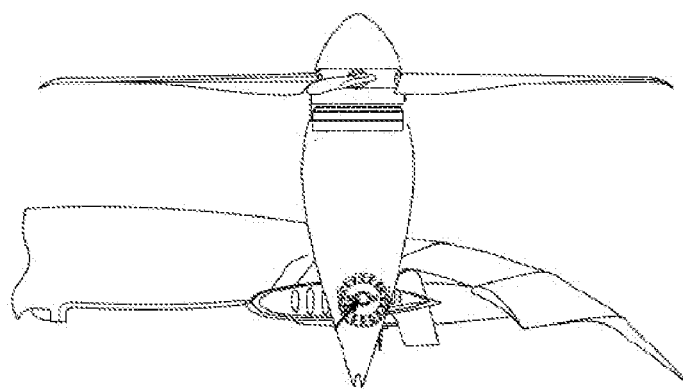

FIG. 9A, FIG. 9B and FIG. 9C illustrate the tilting of the propulsion systems 108 and related components such as the propeller 902 and nacelle 904 according to some examples. The aircraft is preferably an eVTOL aircraft 100 (e.g., a multi-modal aircraft) as illustrated, but can additionally or alternatively include any suitable aircraft. The aircraft 100 is preferably a tiltrotor aircraft with a plurality of aircraft propulsion systems that are operable between a forward arrangement (FIG. 9A, and FIG. 10A) and a hover or vertical flight arrangement (FIG. 9C and FIG. 10C). However, the aircraft can alternatively be a fixed wing aircraft with one or more rotor assemblies or propulsion systems, a helicopter with one or more rotor assemblies (e.g., wherein at least one rotor assembly or aircraft propulsion system is oriented substantially axially to provide horizontal thrust), a tiltwing aircraft, a wingless aircraft (e.g., a helicopter, multi-copter, quadcopter), and/or any other suitable rotorcraft or vehicle propelled by propellers or rotors.

As shown in FIG. 9A to FIG. 9C, in one example a nacelle 904 including the aircraft propulsion systems 108 (including a motor, two power inverters and a radiator) and a propeller 902 with a blade-pitching mechanism 908 are tilted relative to the rest of the aircraft 100 by a tilt mechanism 906 located towards the rear of the nacelle 904.

When integrated into a propulsion tilt mechanism in an aircraft configurable between a forward configuration and a hover configuration, cooling subsystems can advantageously utilize an increase in available airflow in a hover configuration as discussed below.

Figure 10A:
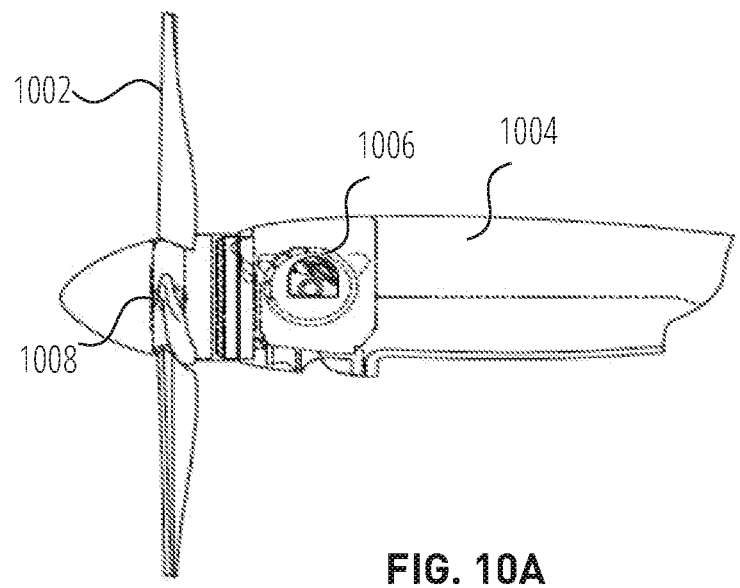
FIG. 10A, FIG. 10B and FIG. 10C illustrate the tilting of an aircraft propulsion system and related components such as a propeller and nacelle according to some examples.
Figure 10B:
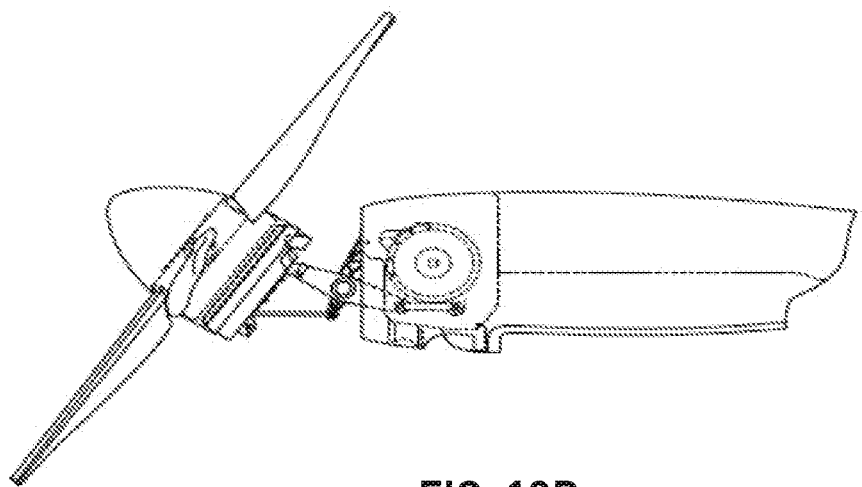
Figure 10C:
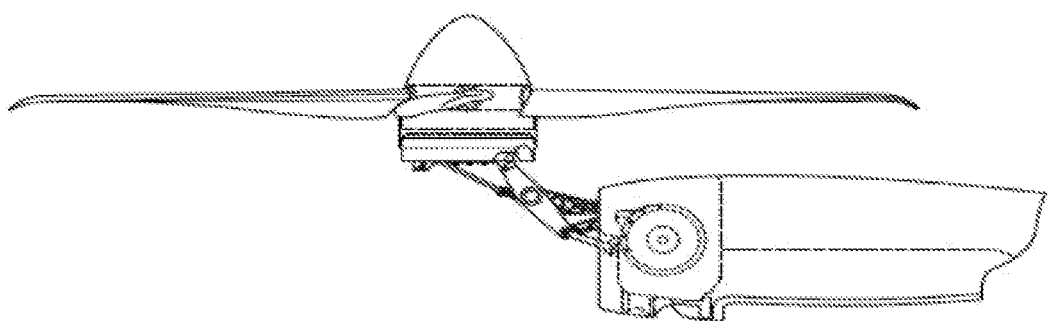

FIG. 10A, FIG. 10B and FIG. 10C illustrate the tilting of the propulsion systems 108 and related components such as the propeller 902 relative to a nacelle 1004 according to some examples. As can be seen in FIG. 10B and FIG. 10C, in this example the aircraft propulsion system propulsion systems 108 (including a motor, two inverters and radiator) and a propeller 1002 with a blade-pitching mechanism 1008 are tilted relative to the nacelle 1004 by a tilt mechanism 1006 located towards the front of the nacelle 1004.

Figure 11:
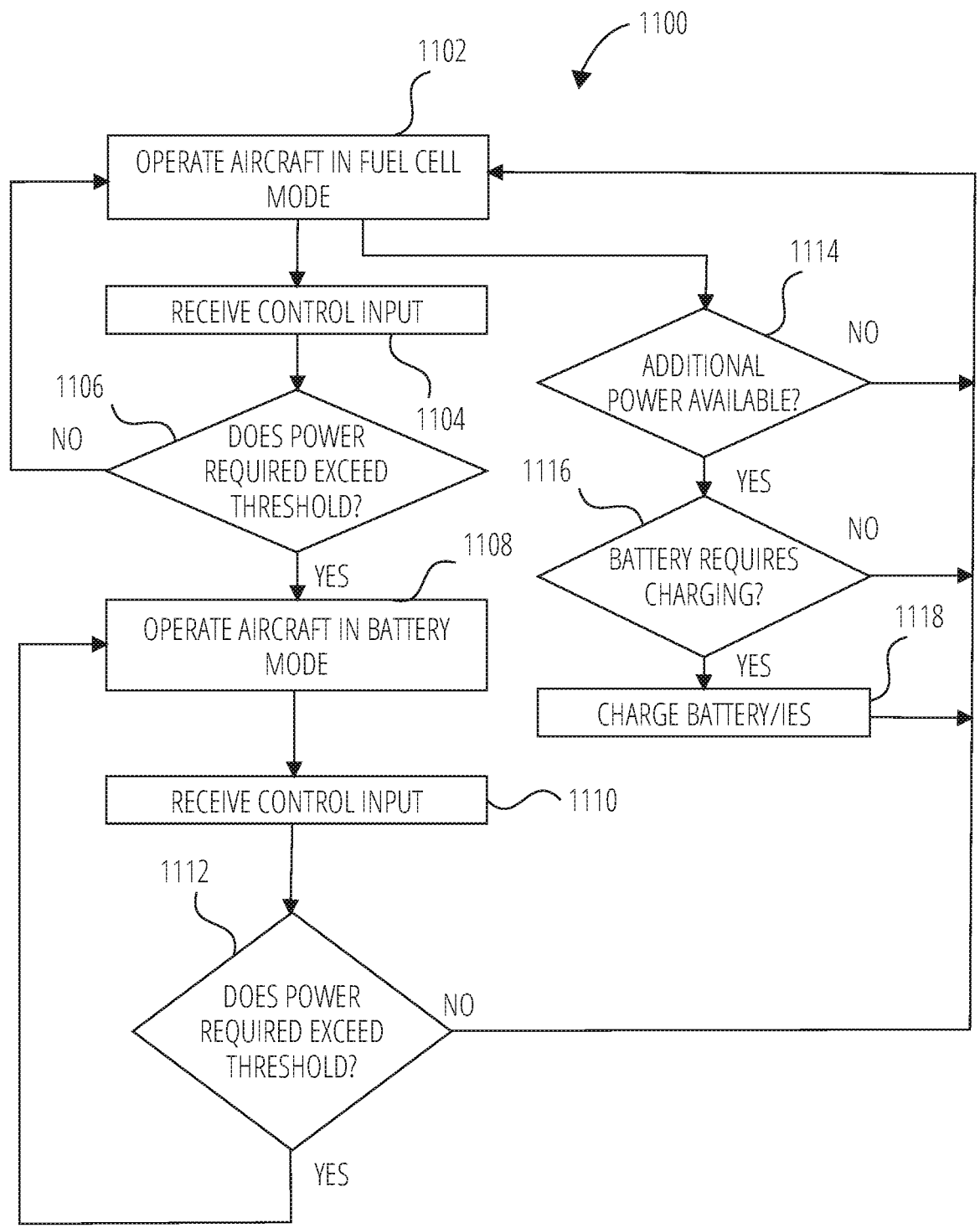
FIG. 11 is a flowchart illustrating a method of providing power to the propulsion systems of an aircraft according to some examples.

FIG. 11 is a flowchart 1100 illustrating a method of providing power to the propulsion systems 108 of aircraft 100 according to some examples. For explanatory purposes, the operations of the flowchart 1100 are described herein as occurring in serial, or linearly. However, multiple operations of the flowchart 1100 may occur in parallel. In addition, the operations of the flowchart 1100 need not be performed in the order shown and/or one or more blocks of the flowchart 1100 need not be performed and/or can be replaced by other operations. The operations of the flowchart 1100 may be performed by the power electronics 214, the power electronics 310, the energy supply management system 302 or another computing device located in the aircraft 100, alone or in combination.

The flowchart 1100 begins at operation 1102 with the aircraft 100 operating in a fuel cell mode in which the aircraft, in particular its propulsion systems 108, are being powered only by the fuel cells 122. This could for example be with the aircraft 100 in a forward flight at a consistent cruising speed and altitude. Alternatively, the aircraft could be on the ground with the rotors stationary and the avionics and other systems being powered by the fuel cells only.

In operation 1104 control inputs or commands are received from a pilot or an autonomous system operating the aircraft 100. In operation 1106 it is determined if the power required to execute the control inputs or commands exceeds or will exceed a predetermined threshold or if the rate of power increase will exceed a predetermined threshold. This can be determined dynamically by monitoring the power drawn by the propulsion systems and/or the rate of change of the power drawn, the voltage and/or frequency of the power signal, or it can be determined predictively or contextually, for example based on the location of the aircraft, whether the nacelles 118 are in a vertical or horizontal thrust generating mode, based on the flight plan of the aircraft, or based on the nature of the command or instruction received.

If it is determined in operation 1106 that the power required does not or will not exceed a threshold (for example if the aircraft 100 is in a forward flight mode and the command or instruction relates to a change in direction or is to descend) or by monitoring of the dynamic power, rate of change of power drawn, current, frequency and so forth, then the flowchart 1100 returns to operation 1102 and the aircraft 100 continues operating in fuel cell mode.

If it is determined in operation 1106 that the power required does or will exceed a threshold (for example if the aircraft 100 is on the ground and the command or instruction relates to powering up the rotors to take off, or if the aircraft is in forward flight and the command or instruction is to go into hover mode, or based on the parameters relating to power draw), then the aircraft operates in battery mode in operation 1108. In battery mode, at least some of the power provided to the propulsion systems comes from the batteries (such as nacelle battery packs 104 and wing battery packs 106 or the batteries described with reference to FIG. 5, FIG. 6 and FIG. 7.

In battery mode, the batteries supplement the power provided to the propulsion systems 108 so that the power demand is met. This permits continued operation of the fuel cells 122 in a more stable manner without requiring rapid adjustments to the power output of the fuel cells. In some examples, the batteries may supply all of the power to one or more or all of the propulsion systems 108. In operation 1110 further control inputs are received.

In operation 1112 it is determined if the power required by the propulsion systems 108 continues to exceed the predetermined power threshold. If it is determined in operation 1112 that the power required no longer exceeds a threshold (for example if the aircraft 100 has transitioned to forward flight mode from a vertical thrust mode resulting in a decline in the power drawn below the predetermined threshold), then the flowchart 1100 returns to operation 1102 and the aircraft 100 resumes operating in fuel cell mode.

If it is determined in operation 1106 that the power required by the propulsion systems 108 continues to exceed the predetermined threshold, the aircraft continues operating in battery mode in operation 1108. In battery mode, at least some of the power provided to the propulsion systems comes from the batteries (such as nacelle battery packs 104 and wing battery packs 106 or the batteries described with reference to FIG. 5, FIG. 6 and FIG. 7.

The flowchart 1100 then continues from either operation 1102 or operation 1108 as appropriate.

When the aircraft 100 is operating in fuel cell mode, it is also determined whether the fuel cell has additional capacity in operation 1114. If not, the aircraft 100 continues operating in fuel cell mode in operation 1102. If it is determined in operation 1114 that the fuel cell has extra capacity, then it is determined in operation 1116 whether the battery requires charging. This determination depends primarily on the state of charge, but can also be based on other factors such as the flight plan and expected demand from the battery, the charging history of individual batteries or battery packs, the available hydrogen in the liquid hydrogen tank 402, and so forth. If the batteries require charging or if charging is appropriate, then the batteries are charged in operation 1118 and the flowchart returns to operation 1102 and proceeds from there.

It will be appreciated that various alternatives are contemplated. In fully dynamic monitoring of the power, current and or frequency of the power delivered to the propulsion systems 108, it would not for example strictly be necessary to receive and assess control inputs in operations 1104 and operation 1110, although as discussed above this can provide additional contextual or predictive data.

Figure 12:
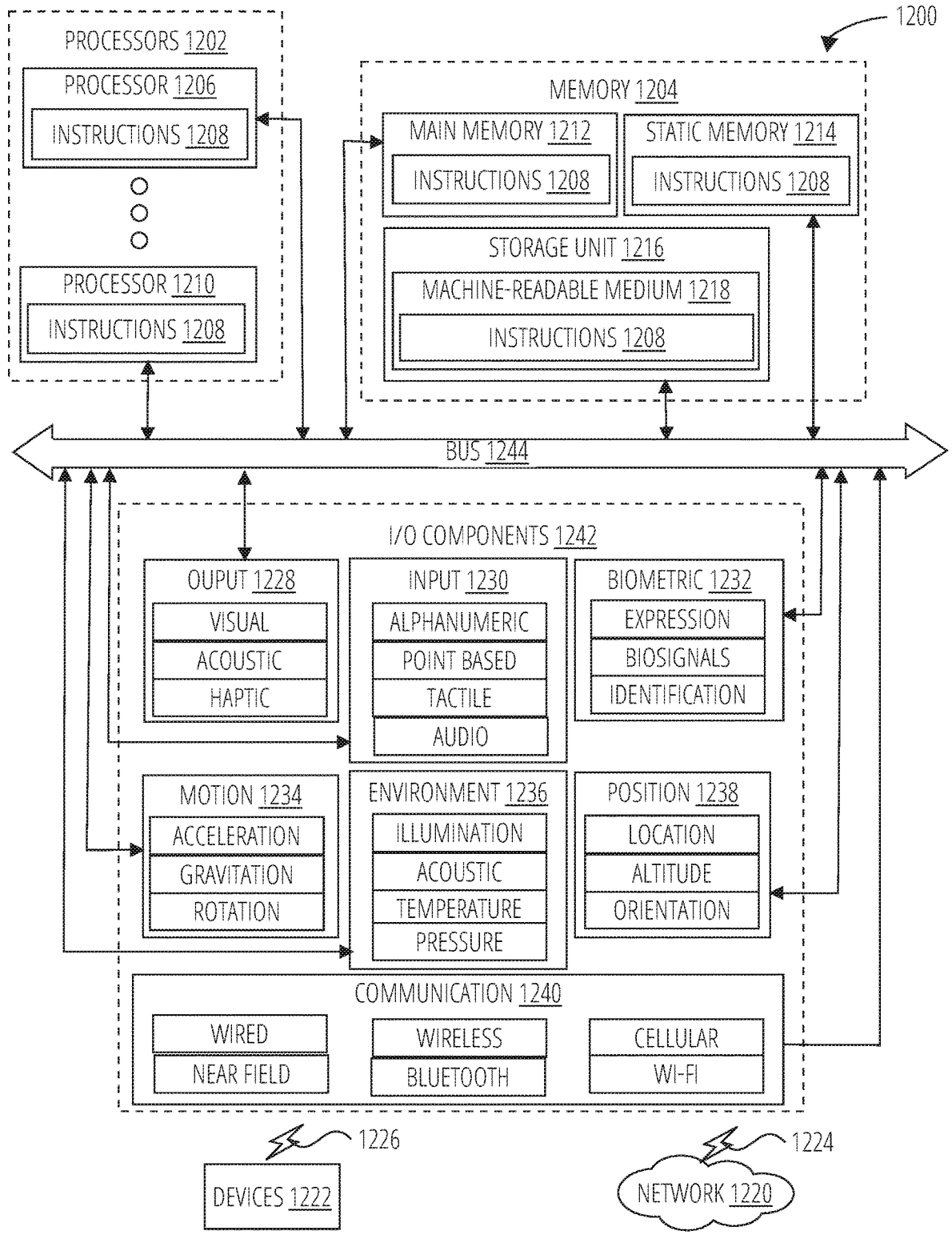
FIG. 12 illustrates a diagrammatic representation of a machine in the form of a computer system within which a set of instructions may be executed for causing the machine to perform any one or more of the methodologies discussed herein, according to some examples.

FIG. 12 illustrates a diagrammatic representation of a machine 1200 in the form of a computer system within which a set of instructions may be executed for causing the machine to perform any one or more of the methodologies discussed herein, according to an example. For example, power electronics 214, power electronics 310 and energy supply management system 302 may be embodied as machine 1200.

Specifically, FIG. 12 shows a diagrammatic representation of the machine 1200 in the example form of a computer system, within which instructions 1208 (e.g., software, a program, an application, an applet, an app, or other executable code) for causing the machine 1200 to perform any one or more of the methodologies discussed herein may be executed. The instructions 1208 transform the general, non-programmed machine 1200 into a particular machine 1200 programmed to carry out the described and illustrated functions in the manner described. In alternative examples, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1208, sequentially or otherwise, that specify actions to be taken by the machine 1200. Further, while only a single machine 1200 is illustrated, the term "machine" shall also be taken to include a collection of machines 1200 that individually or jointly execute the instructions 1208 to perform any one or more of the methodologies discussed herein.

The machine 1200 may include processors 1202, memory 1204, and I/O components 1242, which may be configured to communicate with each other such as via a bus 1244. In an example, the processors 1202 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1206 and a processor 1210 that may execute the instructions 1208. The term "processor" is intended to include multi-core processors that may comprise two or more independent processors (sometimes referred to as "cores") that may execute instructions contemporaneously. Although FIG. 12 shows multiple processors 1202, the machine 1200 may include a single processor with a single core, a single processor with multiple cores (e.g., a multi-core processor), multiple processors with a single core, multiple processors with multiples cores, or any combination thereof.

The memory 1204 may include a main memory 1212, a static memory 1214, and a storage unit 1216, both accessible to the processors 1202 such as via the bus 1244. The main memory 1204, the static memory 1214, and storage unit 1216 store the instructions 1208 embodying any one or more of the methodologies or functions described herein. The instructions 1208 may also reside, completely or partially, within the main memory 1212, within the static memory 1214, within machine-readable medium 1218 within the storage unit 1216, within at least one of the processors 1202

(e.g., within the processor's cache memory), or any suitable combination thereof, during execution thereof by the machine 1200.

The I/O components 1242 may include a wide variety of components to receive input, provide output, produce output, transmit information, exchange information, capture measurements, and so on. The specific I/O components 1242 that are included in a particular machine will depend on the type of machine. For example, portable machines such as mobile phones will likely include a touch input device or other such input mechanisms, while a headless server machine will likely not include such a touch input device. It will be appreciated that the I/O components 1242 may include many other components that are not shown in FIG. 12. The I/O components 1242 are grouped according to functionality merely for simplifying the following discussion and the grouping is in no way limiting. In various examples, the I/O components 1242 may include output components 1228 and input components 1230. The output components 1228 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1230 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 1242 may include biometric components 1232, motion components 1234, environmental components 1236, or position components 1238, among a wide array of other components. For example, the biometric components 1232 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1234 may include acceleration sensor components (e.g., accelerometer), gravitation sensor components, rotation sensor components (e.g., gyroscope), and so forth. The environmental components 1236 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1238 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1242 may include communication components 1240 operable to couple the machine 1200 to a network 1220 or devices 1222 via a coupling 1224 and a coupling 1226, respectively. For example, the communication components 1240 may include a network interface component or another suitable device to interface with the network 1220. In further examples, the communication components 1240 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1222 may be another machine or any of a wide variety of peripheral devices (e.g., a peripheral device coupled via a USB).

Moreover, the communication components 1240 may detect identifiers or include components operable to detect identifiers. For example, the communication components 1240 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1240, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., memory 1204, main memory 1212, static memory 1214, and/or memory of the processors 1202) and/or storage unit 1216 may store one or more sets of instructions and data structures (e.g., software) embodying or utilized by any one or more of the methodologies or functions described herein. These instructions (e.g., the instructions 1208), when executed by processors 1202, cause various operations to implement the disclosed examples.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various examples, one or more portions of the network 1220 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network; a Wi-Fi® network, another type of network, or a combination of two or more such networks. For example, the network 1220 or a portion of the network 1220 may include a wireless or cellular network, and the coupling 1224 may be a Code Division Multiple Access (CDMA) connection, a Global System for Mobile communications (GSM) connection, or another type of cellular or wireless coupling. In this example, the coupling 1224 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1208 may be transmitted or received over the network 1220 using a transmission medium via a network interface device (e.g., a network interface component included in the communication components 1240) and utilizing any one of a number of well-known transfer protocols (e.g., hypertext transfer protocol (HTTP)). Similarly, the instructions 1208 may be transmitted or received using a transmission medium via the coupling 1226 (e.g., a peer-to-peer coupling) to the devices 1222. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1208 for execution by the machine 1200, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

Examples of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The term "rotor" as utilized herein when referring to a thrust-generating element, can refer to a rotor, a propeller, and/or any other suitable rotary aerodynamic actuator. While a rotor can refer to a rotary aerodynamic actuator that makes use of an articulated or semi-rigid hub (e.g., wherein the connection of the blades to the hub can be articulated, flexible, rigid, and/or otherwise connected), and a propeller can refer to a rotary aerodynamic actuator that makes use of a rigid hub (e.g., wherein the connection of the blades to the hub can be articulated, flexible, rigid, and/or otherwise connected), no such distinction is explicit or implied when used herein, and the usage of "rotor" can refer to either configuration, and any other suitable configuration of articulated or rigid blades, and/or any other suitable configuration of blade connections to a central member or hub. Likewise, the usage of "propeller" can refer to either configuration, and any other suitable configuration of articulated or rigid blades, and/or any other suitable configuration of blade connections to a central member or hub. Accordingly, the tiltrotor aircraft can be referred to as a tilt-propeller aircraft, a tilt-prop aircraft, and/or otherwise suitably referred to or described.

The term "board" as utilized herein, in reference to the control board, inverter board, or otherwise, preferably refers to a circuit board. More preferably, "board" refers to a printed circuit board (PCB) and/or electronic components assembled thereon, which can collectively form a printed circuit board assembly (PCBA). In a first example, the control board is a PCBA. In a second example, each inverter board is a PCBA. However, "board" can additionally or alternatively refer to a single sided PCB, double sided PCB, multi-layer PCB, rigid PCB, flexible PCB; and/or can have any other suitable meaning.

The aircraft can include any suitable form of power storage or power storage unit (battery, flywheel, ultra-capacitor, battery, fuel tank, etc.) which powers the actuator(s) (e.g., rotor/propeller, tilt mechanism, blade pitch mechanism, cooling systems, etc.). The preferred power/fuel source is a battery; however the system could reasonably be employed with any suitable power/fuel source. The aircraft can include auxiliary and/or redundant power sources (e.g., backup batteries, multiple batteries) or exclude redundant power sources. The aircraft can employ batteries with any suitable cell chemistries (e.g., Li-ion, nickel cadmium, etc.) in any suitable electrical architecture or configuration (e.g., multiple packs, bricks, modules, cells; etc.; in any combination of series and/or parallel architecture).

In a specific example, the system integrated into an electric tiltrotor aircraft including a plurality of tiltable rotor assemblies (e.g., six tiltable rotor assemblies). The electric tiltrotor aircraft can operate as a fixed wing aircraft, a rotary-wing aircraft, and in any liminal configuration between a fixed and rotary wing state (e.g., wherein one or more of the plurality of tiltable rotor assemblies is oriented in a partially rotated state). The control system of the electric tiltrotor aircraft in this example can function to command and control the plurality of tiltable rotor assemblies within and/or between the fixed wing arrangement and the rotary-wing arrangement.

The term "substantially" as utilized herein can mean: exactly, approximately, within a predetermined threshold or tolerance, and/or have any other suitable meaning.

Alternative examples implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Examples of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the examples of the invention without departing from the scope of this invention defined in the following claims.

Examples of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the examples of the invention disclosed herein without departing from the scope of this invention defined in the following claims.

The following, non-limiting examples, detail certain aspects of the present subject matter to solve the challenges and provide the benefits discussed herein, among others.

Example 1 is a system for distributing electrical energy, the system comprising: a first set of electrically-powered devices; a second set of electrically-powered devices; a first battery system coupled to one or more of the first set of electrically-powered devices; a first fuel cell coupled to one or more of the first set of electrically-powered devices; a second battery system coupled to one or more of the second set of electrically-powered devices; and a second fuel cell coupled to one or more of the second set of electrically-powered devices.

In Example 2, the subject matter of Example 1 includes, wherein the first fuel cell is coupled to the first battery system to charge the first battery system.

In Example 3, the subject matter of Examples 1-2 includes, wherein the first fuel cell is coupled to the second battery system to charge the second battery system.

In Example 4, the subject matter of Examples 1-3 includes, a set of propulsion systems, each of the set of propulsion systems having an electrically-powered device from the first set of electrically-powered devices coupled thereto and an electrically-powered device from the second set of electrically-powered devices coupled thereto.

In Example 5, the subject matter of Example 4 includes, wherein the one or more of the first set of electrically-powered devices coupled to the first fuel cell and the one or more of the second set of electrically-powered devices coupled to the first fuel cell cumulatively, provide power to all of the propulsion systems such that all of the propulsion systems can be powered by the first fuel and the second fuel cell together.

In Example 6, the subject matter of Examples 4-5 includes, wherein the one or more of the first set of electrically-powered devices coupled to the first battery system and the one or more of the first set of electrically-powered devices coupled to the second battery system cumulatively provide power to all of the propulsion systems such that all of the propulsion systems can be powered by the first battery system and the second battery system together.

In Example 7, the subject matter of Examples 5-6 includes, wherein the one or more of the first set of electrically-powered devices coupled to the first battery system and the one or more of the first set of electrically-powered devices coupled to the second battery system cumulatively provide power to all of the propulsion systems such that all of the propulsion systems can be powered by the first battery system and the second battery system together.

In Example 8, the subject matter of Examples 4-7 includes, wherein during operation, the first fuel cell and the second fuel cell power the set of propulsion systems during steady-state operation.

In Example 9, the subject matter of Example 8 includes, wherein during operation, the first fuel cell and the second fuel cell recharge the first and second battery systems during steady-state operation.

In Example 10, the subject matter of Examples 6-9 includes, wherein during operation, the first battery system and the second battery system provide power to the set of propulsion systems during high-power operation of the propulsion systems.

In Example 11, the subject matter of Example 10 includes, wherein during operation, the first fuel cell and the second fuel cell also provide power to the set of propulsion systems during high-power operation of the propulsion systems.

In Example 12, the subject matter of Examples 8-11 includes, wherein during operation, the first battery system and the second battery system provide power to the set of propulsion systems during high-power operation of the propulsion systems.

In Example 13, the subject matter of Example 12 includes, wherein during operation, the first fuel cell and the second fuel cell also provide power to the set of propulsion systems during high-power operation of the propulsion systems.

In Example 14, the subject matter of Examples 9-13 includes, wherein steady-state operation is a horizontal flight mode in an aircraft.

In Example 15, the subject matter of Examples 10-14 includes, wherein high-power operation is a vertical flight mode in an aircraft.

In Example 16, the subject matter of Examples 10-15 includes, wherein the first battery system and the second battery system each comprise a plurality of batteries, each of the plurality of batteries in each of the first battery system and the second battery system being coupled to different electrically-powered devices in the first and second sets of electrically-powered devices.

Example 17 is a method of operating a system for distributing electrical energy, the system comprising a first set of electrically-powered devices; a second set of electrically-powered devices; a first battery system coupled to one or more of the first set of electrically-powered devices; a first fuel cell coupled to one or more of the first set of electrically-powered devices; a second battery system coupled to one or more of the second set of electrically-powered devices; a second fuel cell coupled to one or more of the second set of electrically-powered devices; and a set of propulsion systems, each of the set of propulsion systems having an electrically-powered device from the first set of electrically-powered devices coupled thereto and an electrically-powered device from the second set of electrically-powered devices coupled thereto, the method comprising: powering the set of propulsion systems using the first fuel cell and the second fuel cell during steady-state operation; and powering the set of propulsion systems at least partly with the first battery system and the second battery system during high-power operation.

In Example 18, the subject matter of Example 17 includes, powering the set of propulsion systems at least partly with the first fuel cell and the second fuel cell during high-power operation.

In Example 19, the subject matter of Examples 17-18 includes, recharging the first battery system and the second battery system during steady-state operation.

In Example 20, the subject matter of Examples 17-19 includes, wherein steady-state operation is a horizontal flight mode in an aircraft and high-power operation is a vertical flight mode in an aircraft.

Example 21 is a system for distributing electrical energy, the system comprising: first and second batteries; a first fuel cell; a first DC/DC converter in electrical communication with the first fuel cell and the first battery; and a second DC/DC converter in electrical communication with the first fuel cell and the second battery; wherein during operation: the first battery supplies a first battery voltage to each of one or more of electrical devices, the second battery supplies a second battery voltage to each of a second subset of the electrical devices, the first DC/DC converter converts a fuel cell voltage from the first fuel cell to a first battery charging voltage for the first battery, and the second DC/DC converter converts the fuel cell voltage from the first fuel cell to a second battery charging voltage for the second battery.

In Example 22, the subject matter of Example 1 optionally includes third and fourth batteries; a second fuel cell; a third DC/DC converter in electrical communication with the second fuel cell and the third battery; and a fourth DC/DC converter in electrical communication with the second fuel cell and the fourth battery; wherein during operation, the third and fourth batteries, the second fuel cell, and the third and fourth DC/DC converters form a redundant system for the first and second batteries, the first fuel cell, and the first and second DC/DC converter.

In Example 23, the subject matter of any one or more of Examples 1-2 optionally include wherein the first battery voltage is approximately equal to the second battery voltage.

In Example 24, the subject matter of any one or more of Examples 1-3 optionally include wherein the first battery voltage is different than the second battery voltage.

In Example 25, the subject matter of any one or more of Examples 1-4 optionally include wherein the fuel cell voltage is approximately equal to at least one of the first battery voltage and the second battery voltage.

In Example 26, the subject matter of any one or more of Examples 1-5 optionally include the first and second subsets of electrical devices, wherein the first subset of the electrical devices and the second subset of the electrical devices include at least one common electrical device.

In Example 27, the subject matter of any one or more of Examples 1-6 optionally include a second fuel cell; and a second DC/DC converter in electrical communication with the second fuel cell and the first and second batteries.

In Example 28, the subject matter of any one or more of Examples 1-7 optionally include wherein at least one of the electrical devices is an inverter.

In Example 29, the subject matter of any one or more of Examples 1-8 optionally include wherein at least one of the electrical devices is an electric motor.

Example 30 is an aircraft comprising the system of Example 1.

Example 31 is a system for distributing electrical energy, the system comprising: a first battery in electrical communication with first and second electrical devices; a first fuel cell in electrical communication with third and fourth electrical devices; and a first DC/DC converter in electrical communication with the first fuel cell and the first battery; wherein during operation: the first battery supplies a first battery voltage to each of the first and second electrical devices, the first fuel cell supplies a first fuel cell voltage to each of the third and fourth electrical devices, and the first DC/DC converter converts the first fuel cell voltage to a first battery charging voltage.

In Example 32, the subject matter of Example 11 optionally includes a second battery in electrical communication with fifth and sixth electrical devices; a second fuel cell in electrical communication with seventh and eighth electrical devices; and a second DC/DC converter in electrical communication with the second fuel cell and the second battery; wherein during operation, the second battery, the second fuel cell, and the second DC/DC converters form a redundant system for the first battery; the first fuel cell, and the first DC/DC converter.

In Example 33, the subject matter of any one or more of Examples 11-12 optionally include wherein the first battery voltage is approximately equal to the first fuel cell voltage.

In Example 34, the subject matter of any one or more of Examples 11-13 optionally include wherein the first battery voltage is different than the first fuel cell voltage.

In Example 35, the subject matter of any one or more of Examples 11-14 optionally include wherein the fuel cell voltage is different than the first battery charging voltage.

In Example 36, the subject matter of any one or more of Examples 11-15 optionally include the first, second, third, and fourth electrical devices, wherein the first and third electrical devices are a first common electrical device, and the second and fourth electrical devices are a second common electrical device.

In Example 37, the subject matter of any one or more of Examples 11-16 optionally include wherein at least one of the electrical devices is an inverter.

In Example 38, the subject matter of any one or more of Examples 11-17 optionally include wherein at least one of the electrical devices is an electric motor.

Example 39 is an aircraft comprising the system of Example 11.

Example 40 is an aircraft comprising: an electrical energy distribution system comprising: first and second batteries; a first fuel cell; a first DC/DC converter in electrical communication with the first fuel cell and the first battery; and a second DC/DC converter in electrical communication with the first fuel cell and the second battery; wherein during operation: the first battery supplies a first battery voltage to each of one or more of electrical devices, the second battery supplies a second battery voltage to each of a second subset of the electrical devices, the first DC/DC converter converts a fuel cell voltage from the first fuel cell to a first battery charging voltage for the first battery, and the second DC/DC converter converts the fuel cell voltage from the first fuel cell to a second battery charging voltage for the second battery.

In Example 41, the subject matter of Example 20 optionally includes third and fourth batteries; a second fuel cell; a third. DC/DC converter in electrical communication with the second fuel cell and the third battery; and a fourth DC/DC converter in electrical communication with the second fuel cell and the fourth battery; wherein during operation; the third and fourth batteries, the second fuel cell, and the third and fourth DC/DC converters form a redundant system for the first and second batteries, the first fuel cell, and the first and second DC/DC converter.

In Example 42, the subject matter of any one or more of Examples 20-21 optionally include wherein the first battery voltage is approximately equal to the second battery voltage.

In Example 43, the subject matter of any one or more of Examples 20-22 optionally include wherein the first battery voltage is different than the second battery voltage.

In Example 44, the subject matter of any one or more of Examples 20-23 optionally include wherein the fuel cell voltage is approximately equal to at least one of the first battery voltage and the second battery voltage.

In Example 45, the subject matter of any one or more of Examples 20-24 optionally include the first and second subsets of electrical devices, wherein the first subset of the electrical devices and the second subset of the electrical devices include at least one common electrical device.

In Example 46, the subject matter of any one or more of Examples 20-25 optionally include a second fuel cell; and a second DC/DC converter in electrical communication with the second fuel cell and the first and second batteries.

In Example 47, the subject matter of any one or more of Examples 20-26 optionally include wherein at least one of the electrical devices is an inverter.

In Example 48, the subject matter of any one or more of Examples 20-27 optionally include wherein at least one of the electrical devices is an electric motor.

Example 49 is an aircraft comprising: an electrical energy distribution system comprising: a first battery in electrical communication with first and second electrical devices; a first fuel cell in electrical communication with third and fourth electrical devices; and a first DC/DC converter in electrical communication with the first fuel cell and the first battery; wherein during operation: the first battery supplies a first battery voltage to each of the first and second electrical devices, the first fuel cell supplies a first fuel cell voltage to each of the third and fourth electrical devices, and the first DC/DC converter converts the first fuel cell voltage to a first battery charging voltage.

In Example 50, the subject matter of Example 29 optionally includes a second battery in electrical communication with fifth and sixth electrical devices; a second fuel cell in electrical communication with seventh and eighth electrical devices; and a second DC/DC converter in electrical communication with the second fuel cell and the second battery; wherein during operation, the second battery, the second fuel cell, and the second DC/DC converters form a redundant system for the first battery, the first fuel cell, and the first DC/DC converter.

In Example 51, the subject matter of any one or more of Examples 29-30 optionally include wherein the first battery voltage is approximately equal to the first fuel cell voltage.

In Example 52, the subject matter of any one or more of Examples 29-31 optionally include wherein the first battery voltage is different than the first fuel cell voltage.

In Example 53, the subject matter of any one or more of Examples 29-32 optionally include wherein the fuel cell voltage is different than the first battery charging voltage.

In Example 54, the subject matter of any one or more of Examples 29-33 optionally include the first, second, third, and fourth electrical devices, wherein the first and third electrical devices are a first common electrical device, and the second and fourth electrical devices are a second common electrical device.

In Example 55, the subject matter of any one or more of Examples 29-34 optionally include wherein at least one of the electrical devices is an inverter.

In Example 56, the subject matter of any one or more of Examples 29-35 optionally include wherein at least one of the electrical devices is an electric motor.

In Example 57, the apparatuses or method of any one or any combination of Examples 1-36 can optionally be configured such that all elements or options recited are available to use or to be selected from.

Example 58 is at least one machine-readable medium including instructions that, when executed by processing circuitry, cause the processing circuitry to perform operations to implement of any of Examples 1-57. Example 59 is an apparatus comprising means to implement of any of Examples 1-57. Example 60 is a system to implement of any of Examples 1-57. Example 61 is a method to implement of any of Examples 1-57.

The above detailed description includes references to the accompanying drawings, which form a part of the detailed description. The drawings show, by way of illustration, specific examples in which the invention can be practiced. Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other examples can be used, such as by one of ordinary skill in the art upon reviewing the above description. The Abstract is provided to comply with 37 C.F.R. § 1.72(b), to al low the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed example. Thus, the following claims are hereby incorporated into the Detailed Description as examples or examples, with each claim standing on its own as a separate example, and it is contemplated that such examples can be combined with each other in various combinations or permutations. The scope of the invention should be determined with reference to the appended claims, along with the full scope of equivalents to which such claims are entitled.

What is claimed is:

1. A system for distributing electrical energy, the system comprising:
    a first set of electrically-powered devices;
    a second set of electrically-powered devices;
    a first battery system coupled to the first set of electrically-powered devices;
    a first fuel cell coupled to the first set of electrically-powered devices;
    a second battery system coupled to the second set of electrically-powered devices;
    a second fuel cell coupled to the second set of electrically-powered devices; and
    a set of propulsion systems having an electrically-powered device from the first set of electrically-powered devices coupled thereto and an electrically-powered device from the second set of electrically-powered devices coupled thereto,
    wherein during operation, (1) the first fuel cell and the second fuel cell power the set of propulsion systems during a horizontal flight mode in the aircraft, and (2) the first battery system and the second battery system at least partly provide power to the set of propulsion systems during a vertical flight mode in the aircraft.

2. The system of claim 1, wherein the first fuel cell is coupled to the first battery system to charge the first battery system.

3. The system of claim 1, wherein the first fuel cell is coupled to the second battery system to charge the second battery system.

4. The system of claim 1, wherein the first set of electrically-powered devices coupled to the first fuel cell and the second set of electrically-powered devices coupled to the second fuel cell cumulatively provide power to all of the propulsion systems such that all of the propulsion systems can be powered by the first fuel cell and the second fuel cell together.

5. The system of claim 4, wherein the first set of electrically-powered devices coupled to the first battery system and the second set of electrically-powered devices coupled to the second battery system cumulatively provide power to all of the propulsion systems such that all of the propulsion systems can be powered by the first battery system and the second battery system together.

6. The system of claim 1, wherein the first set of electrically-powered devices coupled to the first battery system and the second set of electrically-powered devices coupled to the second battery system cumulatively provide power to all of the propulsion systems such that all of the propulsion systems can be powered by the first battery system and the second battery system together.

7. The system of claim 1, wherein during operation, the first fuel cell and the second fuel cell recharge the first and second battery systems during the horizontal flight mode in the aircraft.

8. The system of claim 1, wherein during operation, the first fuel cell and the second fuel cell also provide power to the set of propulsion systems during the vertical flight mode in the aircraft.

9. The system of claim 1, wherein the first battery system and the second battery system each comprise a plurality of batteries, each of the plurality of batteries in each of the first battery system and the second battery system being coupled to different electrically-powered devices in the first and second sets of electrically-powered devices.

10. A method of operating a system for distributing electrical energy, the system comprising a first set of electrically-powered devices;
    a second set of electrically-powered devices;
    a first battery system coupled to the first set of electrically-powered devices;
    a first fuel cell coupled to the first set of electrically-powered devices;
    a second battery system coupled to the second set of electrically-powered devices;
    a second fuel cell coupled to the second set of electrically-powered devices; and
    a set of propulsion systems having an electrically-powered device from the first set of electrically-powered devices coupled thereto and an electrically-powered device from the second set of electrically-powered devices coupled thereto, the method comprising:
    powering the set of propulsion systems using the first fuel cell and the second fuel cell during a horizontal flight mode in an aircraft; and
    powering the set of propulsion systems at least partly with the first battery system and the second battery system during a vertical flight mode in an aircraft.

11. The method of claim 10, further comprising:
    powering the set of propulsion systems at least partly with the first fuel cell and the second fuel cell during the vertical flight mode in the aircraft.

12. The method of claim 10, further comprising:
    recharging the first battery system and the second battery system during the horizontal flight mode in the aircraft.

13. The method of claim 10, wherein the first fuel cell is coupled to the first battery system to charge the first battery system.

14. The method of claim 13, wherein the first fuel cell is coupled to the second battery system to charge the second battery system.

15. The method of claim 13, wherein the second fuel cell is coupled to the second battery system to charge the second battery system.

16. The method of claim 10, further comprising cumulatively providing power to all of the propulsion systems using the first set of electrically-powered devices coupled to the first fuel cell and the second set of electrically-powered devices coupled to the first second cell, such that all of the propulsion systems can be powered by the first fuel and the second fuel cell together.

17. The method of claim 10, further comprising cumulatively providing power to all of the propulsion systems using the first set of electrically-powered devices coupled to the first battery system and the second set of electrically-powered devices coupled to the second battery system, such that all of the propulsion systems can be powered by the first battery system and the second battery system together.

18. The method of claim 10, wherein the first battery system and the second battery system each comprise a plurality of batteries, each of the plurality of batteries in each of the first battery system and the second battery system being coupled to different electrically-powered devices in the first and second sets of electrically-powered devices.

\* \* \* \* \*